(12) United States Patent
Kaplan et al.

(10) Patent No.: US 10,296,981 B2
(45) Date of Patent: May 21, 2019

(54) METHOD AND SYSTEM FOR AUTOMATED LOCATION-DEPENDENT RECOGNITION OF STORM RISKS AND EXPOSURE-BASED PARAMETRIC RISK-TRANSFER

(71) Applicant: SWISS REINSURANCE COMPANY LTD., Zurich (CH)

(72) Inventors: Alexander Scott Kaplan, Washington, DC (US); Megan Elizabeth Linkin, Ridgewood, NJ (US)

(73) Assignee: SWISS REINSURANCE COMPANY LTD., Zurich (CH)

( * ) Notice: Subject to any disclaimer, the term of this patent is extended or adjusted under 35 U.S.C. 154(b) by 421 days.

(21) Appl. No.: 15/265,511

(22) Filed: Sep. 14, 2016

(65) Prior Publication Data

US 2018/0075537 A1 Mar. 15, 2018

(51) Int. Cl.
*G06N 7/00* (2006.01)
*G06Q 40/08* (2012.01)

(52) U.S. Cl.
CPC ............ *G06Q 40/08* (2013.01); *G06N 7/005* (2013.01)

(58) Field of Classification Search
CPC .......... G06Q 4/08; G06Q 40/08; G06N 7/005
USPC ........................................................... 705/4
See application file for complete search history.

(56) References Cited

U.S. PATENT DOCUMENTS

| | | | | |
|---|---|---|---|---|
| 7,970,543 B2 * | 6/2011 | Powell | .................... | G01W 1/10 702/9 |
| 9,196,145 B2 * | 11/2015 | Guatteri | ................. | G08B 31/00 |
| 9,810,811 B2 * | 11/2017 | Marshall | ................. | G01W 1/10 |
| 2005/0108150 A1 * | 5/2005 | Pethick | .................. | G06Q 10/04 705/38 |
| 2009/0303056 A1 * | 12/2009 | Bresch | .................... | G01W 1/10 340/601 |
| 2015/0112734 A1 * | 4/2015 | Knaust | .................... | G06F 19/00 705/4 |
| 2017/0004581 A1 * | 1/2017 | Trohler | .................. | G06Q 10/10 |

* cited by examiner

*Primary Examiner* — Robert R Niquette
(74) *Attorney, Agent, or Firm* — Oblon, McClelland, Maier & Neustadt, L.L.P.

(57) ABSTRACT

Proposed is a system and a method for a parametric risk transfer system based on automated location-dependent probabilistic tropical storm risk and storm impact forecast, wherein weather measuring parameters of weather events are measured by means of a plurality of delocalized distributed weather flow stations and transmitted to a central system, and wherein the measured weather measuring parameters at least comprise measuring parameters of wind speed and/or maximum wind speed within a predefined time frame. A spatial high-resolution grid comprising grid cells is generated over a geographical area of interest, and a wind field profile is dynamically generated, wherein by triggering an indexed wind field parameter of the wind field profile exceeding a predefined trigger, an output activation signal is generated based on the wind field parameter and transmitted to an associated activation device, wherein the operation of the activation device is steered by the transmitted output activation signal.

30 Claims, 8 Drawing Sheets
(7 of 8 Drawing Sheet(s) Filed in Color)

METHOD AND SYSTEM FOR AUTOMATED LOCATION-DEPENDENT RECOGNITION OF STORM RISKS AND EXPOSURE-BASED PARAMETRIC RISK-TRANSFER

FIELD OF THE INVENTION

The present invention relates to systems for automated location-dependent recognition of storm risks and exposure-based parametric risk-transfer, and corresponding forecast systems for automated location-dependent probabilistic storm forecast and wind field forecast respectively wind-filed and exposure-induced risk-transfer, wind field states being measured or captured and location-dependent probability values (exposure) being generated. Further, the invention relates to forecast and/or exposure-based risk-transfer systems comprising automated location-dependent recognition of storm impacts and further relates to forecast and/or parametric exposure-based risk-transfer systems based upon topologic associated loss distributions and measures of these distributions, such as Average Annual Loss (AAL) and Probable Maximal Loss (PML) due to windstorms. More specifically, the invention relates to an adaptive, automated system and method for automated location-dependent probabilistic storm forecast, wind field forecast, and actual loss distribution (exposure) forecast due to tropical storms such as tropical cyclones, hurricanes and typhoons. Finally, the invention relates to automated operatable, parametric risk transfer systems triggered and/or signaled by the inventive systems based on automated location-dependent recognition of storm risks and exposures, associated with appropriate parametric insurance cover. In particular, the invention relates to a system and a method where a county-specific storm zone table is used to derive high-resolution data on vulnerability factors for generalized insurance risk factors.

BACKGROUND OF THE INVENTION

Today, an appropriate automated storm rating system, and specifically an automated, self-sufficient parametric risk-transfer system based on automated recognized or measured storm risk exposures, is painfully lacking. For many countries, with specific topological structural conditions or geographic realities, already providing a technically correct storm rating or measure of storm risk exposure is technically nearly impossible. A glance at the loss history shows that economic losses caused by storms, in particular tropical storms, are as high or higher than those of earthquakes, floods and other perils. For most of these other perils, there are already various rating, forecast, and prediction systems allowing technically the automated risk-transfer by means of appropriately realized self-sufficient risk-transfer systems. Large amounts of money, industrial power and time are lost due to storm events. Additionally, with the trend of increasing risk transfer penetration for storms, the insurance industry and re-insurance industry as well as the countries and its population is affected ever more by storm losses. To extend storm rating and forecasting to detailed predictions and impact measurements, however, the threat of immense quantities of data must be addressed. This is done through completely new concepts on the hazard event side as well as on the system and/or method side.

Storms, and in particular tropical storms such as cyclones, hurricanes, and typhoons, etc., cause severe damage in various parts of the world at regular intervals. Climate change has worsened the situation considerably, causing a wide variety of technical problems, inter alia for precise forecasting systems and adequately signaled intervention systems for physical or monetary intervention to at least mitigate the problems in-situ. Sophisticated forecast systems are the most important technical means to face and mitigate such potential future events in advance. Such systems impact preventive measures and systems, such as steering and initiating fortification measures, actual measures during the occurrence, such as controlling, timing, and steering intervention means, signaling and alarm systems, and finally controlling and steering measures following such a storm event.

In particular, the examples given in this document address storms and tropical storms, whereas specific types of tropical storms such as cyclones, hurricanes and typhoons, etc. can be treated in the same manner. Hurricanes are the most severe category of the meteorological phenomenon known as the "tropical cyclone." Hurricanes, like all tropical cyclones, include a pre-existing weather disturbance, warm tropical oceans, moisture, and relatively light winds aloft. If the right conditions persist long enough, they can combine to produce the violent winds, incredible waves, torrential rains and floods associated with this phenomenon. Thus, the formation of a tropical cyclone and its growth into a hurricane, for example, requires: 1) a pre-existing weather disturbance; 2) ocean temperatures of at least 26° C. to a depth of about 45 m; and 3) winds that are relatively light throughout the depth of the atmosphere (low wind shear). Typically, tropical storms and hurricanes weaken when their sources of heat and moisture are cut off (as happens when they move over land) or when they encounter strong wind shear. However, a weakening hurricane can reintensify if it moves into a more favorable region. The remnants of a land falling hurricane can still cause considerable damage. Each year, an average of ten tropical storms develop over the Atlantic Ocean, Caribbean Sea and Gulf of Mexico. Many of these remain over the ocean. Six of these storms become hurricanes each year. In an average 3-year period, roughly five hurricanes strike the United States coastline, for instance, killing approximately 50 to 100 people anywhere from Texas to Maine. Of these, two are typically major hurricanes (wind speeds exceeding 110 mph).

However, it is technically difficult, if not impossible, to predict the occurrence of such weather events over the long term and furthermore to forecast and in-depth rate their actual localized impact on the ground. Even with a detailed wind field map, which can not be provided by prior art systems on an aggregated high-resolution grid level for definable territories or counties, the path or movement of an existing storm can also be difficult to predict over a period of hours or days. As an example, consider storm Isaac (AL092012), which lasted from Aug. 21 to Sep. 1, 2012. Isaac was a tropical storm, which became a category 1 hurricane on the Saffir-Simpson Hurricane Wind Scale, just a few hours before landfall in southeastern Louisiana. The tropical cyclone produced heavy rainfall and inland flooding across portions of the Caribbean as it moved through the Lesser Antilles, and it made landfalls along southwestern Haiti and eastern Cuba. Isaac became a large tropical cyclone and caused an extensive storm surge and inland flooding over southern Mississippi and southeastern Louisiana. Isaac is estimated to be directly responsible for 34 deaths, including 24 in Haiti, 5 in the Dominican Republic, and 5 in the United States.

To illustrate the technical problems associated with forecasting and impact rating systems for tropical storms, the synoptic history of Isaac provided below may be useful. It first bears mentioning that one of the problems that comes with capturing and forecasting the development of tropical storms such as Isaac is caused by the finite nature and structure of automated electronically produced systems. Isaac originated from a tropical turbulent flow that moved off the coast of Africa on August 16. A broad area of low pressure developed along the tropical turbulent flow axis south of the Cape Verde Islands on August 17th, but did not develop a well-defined center of circulation until 1200 UTC (Coordinated Universal Time) on August 20 over the central tropical Atlantic. Deep convection became sufficiently organized near the center of the structural low for the system to be classified as a tropical depression at 0600 UTC August 21, when it was centered about 625 n mi east of the Lesser Antilles. The depression strengthened and became a tropical storm 12 hours later, about 450 n ml east of the Lesser Antilles. Isaac's path is illustrated in FIG. 1, showing a diagram schematically illustrating tracking positions of Hurricane Isaac from Aug. 21-Sep. 1, 2012 provided by the NOAA (National Oceanic and Atmospheric Administration) Hydrometeorological Prediction Center. Table 1 gives an overview of the tracked positions and intensities.

TABLE 1 tracking for Hurricane Isaac, Aug. 21-Sep. 1, 2012

| Date/Time (UTC) | Latitude (°N) | Longitude (°W) | Pressure (mb) | Wind Speed (kt) | Stage |
|---|---|---|---|---|---|
| 20/1200 | 15.7 | 44.8 | 1010 | 25 | Low |
| 20/1800 | 15.6 | 46.8 | 1009 | 30 | " |
| 21/0000 | 15.2 | 48.5 | 1008 | 30 | " |
| 21/0600 | 14.9 | 50.1 | 1007 | 30 | tropical depression |
| 21/1200 | 15.0 | 51.6 | 1006 | 30 | " |
| 21/1800 | 15.2 | 53.1 | 1005 | 35 | tropical storm |
| 22/0000 | 15.4 | 54.8 | 1004 | 40 | " |
| 22/0600 | 15.7 | 56.6 | 1003 | 45 | " |
| 22/1200 | 15.9 | 58.6 | 1004 | 45 | " |
| 22/1800 | 16.1 | 60.4 | 1004 | 45 | " |
| 23/0000 | 15.7 | 62.0 | 1004 | 45 | " |
| 23/0600 | 15.0 | 63.4 | 1004 | 45 | " |
| 23/1200 | 15.1 | 65.0 | 1003 | 45 | " |
| 23/1800 | 15.6 | 66.4 | 1003 | 45 | " |
| 24/0000 | 15.7 | 67.8 | 1002 | 45 | " |
| 24/0600 | 15.4 | 69.1 | 998 | 45 | " |
| 24/1200 | 15.7 | 70.4 | 995 | 50 | " |
| 24/1800 | 16.6 | 71.2 | 993 | 55 | " |
| 25/0000 | 17.3 | 71.8 | 992 | 55 | " |
| 25/0600 | 18.3 | 72.7 | 991 | 55 | " |
| 25/1200 | 19.6 | 73.9 | 997 | 50 | " |
| 25/1800 | 20.8 | 75.2 | 997 | 50 | " |
| 26/0000 | 21.8 | 76.7 | 997 | 50 | " |
| 26/0600 | 22.7 | 78.3 | 995 | 55 | " |
| 26/1200 | 23.4 | 80.0 | 995 | 55 | " |
| 26/1800 | 23.7 | 81.4 | 992 | 50 | " |
| 27/0000 | 24.2 | 82.6 | 990 | 50 | " |
| 27/0600 | 25.0 | 83.6 | 989 | 50 | " |
| 27/1200 | 15.7 | 70.4 | 995 | 55 | " |
| 27/1800 | 16.6 | 71.2 | 993 | 60 | " |
| 28/0000 | 17.3 | 71.8 | 992 | 60 | " |
| 28/0600 | 18.3 | 72.7 | 991 | 60 | " |
| 28/1200 | 19.6 | 73.9 | 997 | 65 | hurricane |
| 28/1800 | 20.8 | 75.2 | 997 | 70 | " |
| 29/0000 | 21.8 | 76.7 | 997 | 70 | " |
| 29/0300 | 22.7 | 78.3 | 995 | 70 | " |
| 29/0600 | 23.4 | 80.0 | 995 | 70 | " |
| 29/1200 | 23.7 | 81.4 | 992 | 65 | " |
| 29/1800 | 24.2 | 82.6 | 990 | 60 | tropical storm |
| 30/0000 | 25.0 | 83.6 | 989 | 55 | " |
| 30/0600 | 25.7 | 84.7 | 987 | 55 | " |
| 30/1200 | 26.3 | 85.7 | 982 | 45 | " |
| 30/1800 | 26.8 | 86.7 | 979 | 35 | " |
| 31/0000 | 27.4 | 87.6 | 978 | 30 | tropical depression |
| 31/0600 | 28.0 | 88.3 | 975 | 25 | " |

TABLE 1-continued tracking for Hurricane Isaac, Aug. 21-Sep. 1, 2012

| Date/Time (UTC) | Latitude (°N) | Longitude (°W) | Pressure (mb) | Wind Speed (kt) | Stage |
|---|---|---|---|---|---|
| 31/1200 | 28.6 | 88.8 | 972 | 20 | " |
| 31/1800 | 28.9 | 89.4 | 967 | 20 | " |
| 01/0000 | 29.0 | 89.7 | 965 | 20 | " |
| 01/0600 | 29.1 | 90.0 | 966 | 20 | " |
| 01/1200 | | | | | dissipated |
| 29/0300 | 29.0 | 89.7 | 965 | 70 | minimum pressure |
| 25/0600 | 18.3 | 72.7 | 991 | 55 | landfall near Jacmel, Haiti |
| 25/1500 | 20.1 | 74.5 | 997 | 50 | landfall near Cajobabo, Guantánamo, Cuba landfall at Southwest |
| 29/0000 | 28.9 | 89.4 | 967 | 70 | Pass at the mouth of the Mississippi River |
| 29/0800 | 29.2 | 90.2 | 966 | 70 | landfall near Port Fourchon, Louisiana |

The boundary conditions and influences on the path and wind fields of storms, in particular tropical storms, are complex and technically difficult to capture. Continuing the above example, a strong deep-layer subtropical ridge over the western Atlantic caused Isaac to move quickly westward at 15 to 20 kt for the next two days. The center of the tropical storm moved through the Leeward Islands between the islands of Guadeloupe and Dominica between 1800 UTC August 22 and 0000 UTC August 23, but the strongest winds were located well to the north of the center, spreading across the northern Leeward Islands and the Virgin Islands. Isaac continued generally westward over the eastern Caribbean Sea until early on August 24, and aircraft and satellite data indicated that the structure of the cyclone became less organized when the low-level center reformed farther south and the circulation became more tilted. Nonetheless, Isaac strengthened to an intensity of 55 kt on August 24, when it turned northwestward toward Hispaniola. The structure of the cyclone began to improve with the formation of a more developed inner core and the first hints of an eye just before Isaac made landfall on the southern coast of Haiti, near the city of Jacmel, around 0600 UTC on August 25. The center of Isaac quickly traversed the narrow southwestern peninsula of Haiti, and the cyclone weakened slightly when the circulation interacted with the mountainous terrain of Hispaniola. Isaac continued northwestward over the Gulf of Gonâve during the early morning hours of August 25 and moved just south of the Windward Passage, making landfall along the southeastern coast of Cuba near Cajobabo, Guantánamo, around 1500 UTC with maximum winds of 50 kt. The center emerged from the northern coast of Cuba into the Atlantic near Rafael Freyre, Holguin, around 2015 UTC. Isaac grew in size during its passage across Haiti and Cuba, with tropical storm-force winds extending up to 180 n mi to the north of the center across the Turks and Caicos Islands and most of the Bahamas.

After emerging over the Atlantic, Isaac turned west-northwestward and moved faster on August 26 between a large deep-layer low over the northwestern Caribbean Sea and a midtropospheric ridge over the western Atlantic. Isaac had maximum sustained winds of 50 kt while the center moved parallel to the northern coast of Cuba toward the Straits of Florida, passing south of the Florida Keys later in the day. Tropical storm-force winds, especially in gusts, affected the Florida Keys and South Florida in rain bands that moved across the area for much of the day. Isaac entered the southeastern Gulf of Mexico early on August 27, moving more slowly toward the west-northwest and northwest as it reached the southwestern periphery of the subtropical ridge. The wind field remained large, and microwave data indicated that deep convection became more organized in a ring around the center of circulation. Isaac gradually strengthened while moving across the Gulf of Mexico and became a hurricane around 1200 UTC on August 28 while centered about 75 n mi southeast of the mouth of the Mississippi River. A midlevel blocking ridge to the northwest of the hurricane caused Isaac to slow down considerably while it approached the coast of Louisiana, which prolonged the strong winds, dangerous storm surge, and heavy rains along the northern Gulf coast. Isaac made its first landfall along the coast of Louisiana at Southwest Pass on the mouth of the Mississippi River around 0000 UTC on August 29 with maximum sustained winds of 70 kt. The center then wobbled westward back over water and made a second landfall just west of Port Fourchon, La., around 0800 UTC on August 29. Isaac gradually weakened once it moved inland over southeastern Louisiana, and it became a tropical storm at 1800 UTC on August 29, when the center was located about 35 n mi west-southwest of New Orleans. A mid-level anticyclone over the southeastern United States steered Isaac northwestward across Louisiana on August 30, and the cyclone weakened to a tropical depression around 0000 UTC on August 31, just after crossing into southern Arkansas. The depression turned northward and moved into extreme southwestern Missouri later on August 31. The center of circulation then lost its definition over western Missouri early on September 1, and Isaac dissipated just after 0600 UTC about 55 n mi west-southwest of Jefferson City, Mo. The remnants of Isaac moved northeastward and eastward across Missouri and Illinois, producing several tornadoes across the Mississippi River Valley later on September 1.

In prior art systems, such tracking may for example include subjective satellite-based Dvorak technique intensity estimates, for instance from the Tropical Analysis and Forecast Branch (TAFB) and the Satellite Analysis Branch (SAB), and/or objective Dvorak estimates from the Cooperative Institute for Meteorological Satellite Studies/University of Wisconsin-Madison (UW-CIMSS). Other data and images, as shown by FIG. 2, are for example available from NOAA polar-orbiting satellites including the Advanced Microwave Sounding Unit (AMSU), the NASA Tropical Rainfall Measuring Mission (TRMM) and Aqua, the European Space Agency's Advanced Scatterometer (ASCAT), the Naval Research Laboratory WindSat, and/or Defense Meteorological Satellite Program (DMSP) satellites, which can, inter alia, be also useful in constructing an existing track, such as Isaac's track. Another type of data is available from Aircraft observation and measurements including flight-level, stepped frequency microwave radiometer (SFMR), and dropwindsonde observations from flights as for example of the 53$^{rd}$ Weather Reconnaissance Squadron of the U.S. Air Force Reserve Command and/or flights of the NOAA Aircraft Operations Center (AOC) WP-3D aircraft. In the case of Isaac, the 53rd Weather Reconnaissance Squadron and the NOAA AOC G-IV aircraft for example flew respective synoptic surveillance flights around Isaac. Further, national weather services, such as WSR-88D Doppler radar data from San Juan, Puerto Rico; Miami, Fla.; Key West, Fla.; and Slidell, La., can be used to make center fixes and obtain velocity data to track storms, if they are near the coast. Météo-France radar data from Guadeloupe and Martinique, for example, as well as radar data from the Institute of Meteorology of Cuba, for example, can also help to track the center of a tropical storm. Finally, another source of data can be found in ship reports of tropical storm force winds associated with the tropical storm and/or selected surface observations from land stations and data buoys.

Wind and pressures are important parameters for tropical storms. In the above example of Isaac, Isaac's analyzed strengthening to a tropical storm is based on a measured 1500-ft flight level wind of 44 kt at 1843 UTC on August 21, which suggests maximum surface winds of about 35 kt, and on bias-adjusted SFMR estimates of about 35 kt between 1800 and 2000 UTC on August 21. Measurements and estimations of the intensity of tropical storms are complex. Typically, there is a great discrepancy between the flight level and surface estimates, and for example the likelihood that an adjustment of the SFMR estimates does fully account for the peak in rain rates, moreover, when the tropical storm moved across an island or land. The large wind field of a tropical storm can lead to extensive storm surge flooding. In the case of Isaac, Isaac for instance impacted extensive storm surge flooding along the northern Gulf of Mexico coastline, especially in southeastern Louisiana, Mississippi, and Alabama. The highest storm surge measured by a NOS tide gauge was 11.03 ft above normal tide levels at Shell Beach, La., on the southern end of Lake Borgne. A storm surge of 6.69 ft was measured at Pilottown, La., near the mouth of the Mississippi River, and a surge of 6.35 ft was observed in New Orleans at New Canal Station on the southern shore of Lake Pontchartrain. In Mississippi, a storm surge of 8.00 ft was measured by the NOS gauge at the Bay Waveland Yacht Club. Farther east, a storm surge of 4.63 ft was measured in Mobile Bay, Ala., at the Coast Guard Sector Mobile facility. Further, the inundation levels of tropical storms, typically expressed above ground level, can be prevalent near the immediate coast, lakeshore, or levee systems due to the storm tide.

One of the most fundamental problems of the prior art system is that there is no such thing as a true measure of a storm. One impressive example can be given by hurricane Katrina. Hurricane Katrina was the eleventh named storm and fifth hurricane of the 2005 Atlantic hurricane season. It was the costliest natural disaster, as well as one of the five deadliest hurricanes, in the history of the United States. The storm is currently ranked as the third most intense United States land-falling tropical cyclone, behind only the 1935 Labor Day hurricane and Hurricane Camille in 1969. The problem was that when hurricane Katrina surged towards New Orleans, people faced the prospect of abandoning their homes to find shelter. Those worst affected were some of the city's most vulnerable citizens, the poor and the elderly, parents with young children, people without cars, and people living in flood-prone areas. Yet Katrina, which was in fact a category 5 storm, was demoted to a category 3 by the time it hit land. However, the forecasting and rating systems were mistaken, since the category rating of the hurricane was not the best measure of the raw destructive power of the storm. So many people, governments and industries did not take the right measures to prevent the catastrophe. As a result of the forecasting systems not correctly capturing the impact of the tropical storm, at least 1,833 people died in the hurricane and subsequent floods, making it the deadliest United States hurricane since the 1928 Okeechobee hurricane. Total property damage was estimated at $108 billion (2005 USD), roughly four times the damage wrought by Hurricane Andrew in 1992. Later, Hurricane Ike in 2008 and Hurricane Sandy in 2012 caused more damage than Hurricane Andrew, but both were far less destructive than Katrina. The hurricane Katrina surge protection failures in New Orleans are considered the worst civil engineering disaster in U.S. history and prompted a lawsuit against the U.S. Army Corps of Engineers (USACE), the designers and builders of the levee system as mandated by the Flood Control Act of 1965.

In the prior art systems, in particular in the western hemisphere, hurricanes are rated on the Saffir-Simpson scale, an empirical measure of storm intensity. To trigger a storm's category rating, the systems measure the highest speed sustained by a gust of wind for an entire minute. The wind's speed is measured at a height of 10 meters because wind speeds increase in relation to the height where they are measured, and it is typically in the vicinity of 10 meters that storms do the most damage. Based on how large this maximum speed is, a storm is assigned in the Saffir-Simpson rating to one of five different categories. The following table 2 shows the Saffir-Simpson rating system.

TABLE 2

Saffir-Simpson hurricane wind scale

| Category | Wind speed |
|---|---|
| Saffir-Simpson rating system | |
| Five | ≥70 m/s, ≥137 knots |
| | ≥157 mph, ≥252 km/h |
| Four | 58-70 m/s, 113-136 knots |
| | 130-156 mph, 209-251 km/h |
| Three | 50-58 m/s, 96-112 knots |
| | 111-129 mph, 178-208 km/h |
| Two | 43-49 m/s, 83-95 knots |
| | 96-110 mph, 154-177 km/h |
| One | 33-42 m/s, 64-82 knots |
| | 74-95 mph, 119-153 km/h |
| Further important classifications | |
| Tropical storm | 18-32 m/s, 34-63 knots |
| | 111-129 mph, 63-118 km/h |
| Tropical depression | ≤17 m/s, ≤33 knots |
| | ≤38 mph, ≤62 km/h |

The Saffir-Simpson Hurricane Scale (SS-Scale) system allows a rough estimation of possible impacts of a tropical storm. As seen above, the SS-scale defines hurricane intensify by categories. A Category 1 storm is the weakest hurricane (winds 64-82 kt); a Category 5 hurricane is the strongest (winds exceeding 135 kt). With respect to the damage caused, it can be said that typically, Category 1 storms with winds between 64-82 kt can normally cause no real damage to building structures. Damage is primarily to unanchored mobile homes, shrubbery and trees. There can be also be some coastal flooding and minor pier damage. Category 2 storms with winds between 83-95 kt can normally cause some roofing material, door and window damage. There can also be considerable damage to vegetation, mobile homes, etc., or flooding damages piers and small craft in unprotected moorings may break their moorings. Category 3 storms, with winds between 96-113 kt, can normally cause some structural damage to small residences and utility buildings, with a minor amount of curtainwall failures. Mobile homes are destroyed. Also, flooding near the coast destroys smaller structures, while larger structures are damaged by floating debris. Terrain may be flooded well inland. Category 4 storms, with winds between 114-135 kt, can normally cause more extensive curtainwall failures with some complete roof structure failure on small residences. There can be also major erosion of beach areas. Terrain may be flooded well inland. Finally, Category 5 storms, with winds of 135+ kt, can normally cause complete roof failure on many residences and industrial buildings. There may be some complete building failures, with small utility buildings blown over or away. Flooding causes major damage to lower floors of all structures near the shoreline. Massive evacuation of residential areas may be required.

The problem with such prior art systems is that they only capture one aspect of a storm's intensity—the highest speed that if can sustain. Not only is it difficult to measure the appropriate peak speed, but different organizations typically come to different conclusions about it, depending on their coverage of the wind data. This number doesn't reveal anything about the size of the storm, or about how the wind speeds are distributed overall. An example can be given by considering the existence of two storms—the first is fierce but more contained, while the second is larger, and though it has lower peak wind speed, these wind speeds are spread over a larger area. The Saffir-Simpson scale would give the first storm a higher score, even though the latter may be more destructive. Based on the rating, people were misled in their expectation about Katrina. Therefore, the rating system based on the SS scale is too simplistic, indicating that the scale takes into account neither the physical size of a storm nor the amount of precipitation it produces. Additionally, the Saffir-Simpson scale-based system, unlike the Richter scale used to measure earthquakes, is not continuous, and is quantized into a small number of categories. Proposed replacement classifications include the Hurricane Intensity Index, which is based on the dynamic pressure caused by a storm's winds, and the Hurricane Hazard Index, which bases itself on surface wind speeds, the radius of maximum winds of the storm, and its translational velocity. Both of these scales are continuous, akin to the Richter scale; however, neither of these scales has been used efficiently up to now.

It is one aim of this invention to provide a reliable, localized measure of a storm. Storms are dangerous because of the energy carried in the moving air. In a storm, strong winds ram into stationary objects, such as trees, buildings, or the surface of the ocean, and impart some of their energy of motion. Some structures can safely absorb this energy, while others will give way. Tropical storms, in particular hurricanes, create a vortex. Vortices are a consequence of the non-linear equations that govern the flow of fluids. In normal situations, these vortices die out, as their energy drains out to the fluid around them. But hurricanes are self-sustaining, fed by evaporating columns of air rising from warm ocean water. Prior art systems, based solely on mathematical simulation, typically fail to model the dynamics of hurricanes adequately. The simulations are complex. On a larger scale, they have to capture the flow of the atmosphere that is responsible for steering the hurricane. On a finer scale, they have to capture the interactions near the core that give the storm its strength. Normally, they try to add just enough essential simulation to reproduce the behavior of the storm, while leaving out the details that will make it impossible to run the simulation with available processor power.

Moreover, correctly forecasting a storm, i.e., its local wind speeds, is only half of the problem. The other part is to forecast how destructive it will be. The storms' strength affects other objects, since every object in motion carries a certain amount of energy, known as its kinetic energy. The kinetic energy of an object depends on the square of its speed, and is directly proportional to the mass of the object. More simply put, it can be assumed that the wind energy over the real size of a storm is related to its true destructive potential. What makes this method very different from the SS scale is that different sizes of wind fields, having the same or different wind speeds, must be appropriately additively captured, which is much more than just the peak intensity of a storm. Therefore, the forecasted parameters must at least take into account how the wind speeds are distributed throughout the bulk of a storm. Some prior art forecasting systems, such as the National Oceanic and Atmospheric Administration, try to measure the strength of a storm by using the so-called integrated kinetic energy of the storm at a certain location. However, these systems also fail to predict the impact correctly, since they do not take the local topological background of the structure into account and are necessarily based on simulations, which then face the same technical problems as described above.

Another aspect is, that automated risk transfer systems, such as automated insurance systems, need to develop ways of assessing and parameterizing the risks associated with such weather events, and factoring that knowledge into the pricing of insurance products and the magnitudes and frequencies of damage to expect over time. Information is available for use in this regard in the form of historical data on storms, which have, occurred through the years. Approximately 80 such storms occur worldwide each year. Data is collected for the storms including positional data for the storm path or track, wind speeds, barometric pressures, and other factors. Such storms are best documented in the North Atlantic (i.e., the portion of the Atlantic Ocean north of the equator), where reliable data covering more than 100 years of activity is available. Approximately 10 storms occur in the North Atlantic region on an annual basis. Historical data is also available for cyclones occurring in the Northwest Pacific, where approximately 26 storms occur each year. Suitable data for these Pacific storms is available only for about the last 50 years. Less data is available for storms in other regions. Using all available historical data, information relating to a few hundred storms is available for review by engineers and scientists for appropriate system design. Such information is useful in assessing risks associated with storm damage in the subject areas. However, given the unpredictable nature of storm behavior, and the number of factors influencing such behaviors, the available data set of historical storms is relatively small from a probabilistic viewpoint. Given that this data set will grow by only a relatively small number of storms per year, a problem exists with regard to performing statistical analysis relating to the possibility of a storm occurring in a particular location.

In summary, in the prior art, existing systems are not able to account correctly for the physical size of a storm, the amount of precipitation it produces, and the effective impact on local structures. Further, they cannot provide a true forecasted measure of a storm and impact rating on an aggregated high-resolution grid level for predefined territory cells and/or counties, which can appropriately be used for corresponding alarm systems and means, damage prevention systems, damage protection systems and/or automated risk transfer systems.

SUMMARY OF THE INVENTION

One object of the present invention is to provide an automated system and method for providing a true measure of an occurring storm and a correct measure and forecast of the associated storm risk, i.e. the storm risk exposure. Another aim of the invention to provide a forecasting system for assessing and measuring the impact of a storm based on the measured storm risk exposure i.e. assessing the risk associated with the impact of a storm. Finally, it is a further aim to provide an automated risk transfer system able to provide a rapid disbursement of funds to assist with the extraneous expenses that entities incur in the immediate aftermath of a storm based on the measured and determined storm risk exposure.

According to the present invention, these aims are achieved in particular with the features of the independent claims. In addition, further advantageous embodiments can be derived from the dependent claims and the related descriptions.

According to the present invention, the above-mentioned aims for a parametric risk transfer system based on automated location-dependent probabilistic tropical storm risks and storm impact forecast are achieved in particular in that in the risk transfer system based on automated location-dependent probabilistic tropical storm risks and storm impact forecast, weather measuring parameters of weather events are measured, recorded by means of a plurality of delocalized distributed measuring stations and transmitted to a central unit, wherein the measured weather measuring parameters at least comprise measuring parameters of wind speed and/or maximum wind speed within a predefined time frame; in that a spatial high resolution grid comprising grid cells is generated over a geographical area of interest by means of a capturing unit, said area including at least a portion of the risk-exposed units on ground, wherein a plurality of delocalized distributed measuring stations are selected and associated with the grid, and wherein each cell of the grid has a defined distance from each of the delocalized distributed measuring stations; in that measuring parameters of the delocalized distributed measuring stations associated with the grid are transferred to the capture unit via a data transmission network, wherein the capturing unit comprises a memory store with a searchable data table wherein data records comprising transmitted measuring parameters are stored that are assigned to the corresponding measuring station by means of the searchable data table; in that by means of a core generator, indexed wind field parameter are dynamically generated for different capturing time frames according to the spatial high-resolution grid and associated with a wind field profile, wherein for each grid cell of the wind field profile, the wind field parameters are determined based on the transmitted measuring parameters, summing up the transmitted measuring parameters of all measuring stations weighted by the station weighting factor assigned to the corresponding weather flow station and grid cell, and normalized over all of the grid cells; in that grid cell specific risk-exposure, parameters are generated by means of the system based upon the indexed wind field parameters of the wind field profile; in that by triggering a grid cell specific risk-exposure parameter exceeding a predefined trigger index value and/or an indexed wind field parameter by means of a trigger module, an output trigger signal is generated by the signal generator based on the triggered excess of the grid cell specific risk-exposure parameter and/or indexed wind-filed value and transmitted to at least one associated activation device, wherein the operation of the activation device is steered by the transmitted output trigger signal. A wind field of each data record can be generated based on a definable wind field profile, and a probability is assigned by an interpolation module to each point in said grid, giving the probability of the occurrence of a specific wind strength at a given geographical location and time. The weather measuring parameter can be measured and/or determined in a low spatial resolution in relation to the grid of a wind field profile. The system can for example generate an aggregated high-resolution grid level for said geographical area or territory based on the low spatial resolution by the measuring stations. The measuring stations can e.g. comprise land-based weather flow stations, satellite-based or plane-based or ship-based measuring devices or stations. Further, the weather measuring parameter can for example be measured and/or determined in a high temporal resolution. The indexed values associated of the wind field profile can for instance be derived based upon at least the weather measuring parameter and topological parameters and/or geo-structural factors representing topological and/or geological local formations. The station weighting factor can for example be generated at least on the horizontal distance and/or elevation difference to the corresponding grid cell. The indexed values can for instance be derived by an interpolation module based upon a country-specific wind zone table depending on the horizontal distance and/or elevation difference. Further, for each selectable grid cell based on the measuring station's proximity, a station weighting factor can be assigned to each measuring station having a higher value the closer a measuring station is to the grid cell. The invention has inter alia the advantage that the system is mainly based on the fact that there is a direct correlation between the speed of sustained winds during a named windstorm and the losses suffered on the ground. Therefore, the system utilizes geographically distributed measuring stations to mirror the variant impacts of hurricanes on the ground, and allows for a rapid and precise capture of storm impacts. Using weather stations across a larger geographical area allows a more dynamic approach, considering how wind speeds can vary across the entire wind field of a storm. Prior art system are, not able to provide such a dynamic structure capturing impacts on ground. The inventive system does not need to use data from data sources such as the National Hurricane Center, which only report the maximum wind speed of the storm and are not able to provide a detailed wind field. By using weather stations, the inventive system is able to provide the wind speed on the ground in the location of the assets. By dynamically using the measurements of the distributed weather stations, the system can provide a more localized view of the reality on the ground. For example, there are more than 100 stations distributed across the Gulf and East Coasts near coastal urban communities. Further, weather flow stations are specifically designed to withstand strong hurricane winds, up to 140 mph. They are completely self-sufficient in the event of a power or communications outage. In contrast, the prior art systems, for example the National Weather Service, use weather measuring, which is primarily located at airports—typically far from the actual assets and locations to be measured—and are not hurricane hardened, thus having a higher failure rate. Furthermore, the prior art systems typically use a single weather station, which may not sufficiently capture the impacts that occur over a larger geographical area, such as an entire county. Since hurricane tracks can approach from nearly endless directions, the inventive system has the advantage of being capable of dynamically measuring at multiple stations and transferring the corresponding data to the central unit dynamically, enhancing the coverage and reducing the risk basis. Based on the stations' proximity to the location or assets of interest, each station is assigned a weighting—a station closer to the values will be given a higher weight in the trigger calculation methodology. This structure of the system does allow for a real-time dynamic tracing of storms localized on ground, which was not previously possible with the prior art systems. Under spatial high resolution, a resolution with a cell size below 1 km$^2$ can for example be understood, in particular a cell size below 10,000 m$^2$. Another advantage of the invention is that a much more economic use of storage can be achieved, which also essentially influences the performance of the rating. For example, instead of storing storm measuring parameters for each of the measuring events, only one dynamic amended wind field map is stored at a highly detailed level (e.g., 100 m resolution). The wind field maps are generated from the data of the measuring stations and the proximity and are stored on the cell level. Both pieces of information are combined to generate the local storm impact and/or storm impact risk at a specific location for all of the measuring cycles. Additionally, better structuring of programs for storm-exposed locations or portfolios can be achieved. Since the contribution of every single risk to the expected losses can be quantified, it is possible to determine, site-dependent sub-limits or even to exclude certain sites from storm coverage. Further essential improvements in storm risk assessment can be provided: It will be the first time in parametrizing and capturing measurement technology that a detailed and fully stochastic storm rating system is achieved. This can have a positive effect on the market positioning of industry and/or insurance and re-insurance, and can generate new business opportunities. Another advantage of the invention is the availability of a detailed automated storm rating and storm impact system, which will make it possible to require better quality property schedule data, e.g., in relation to identifying which risk transfer parameters and policies have an optimized storm risk coverage. Finally, improved capacity allocation and determination can be done: With a new wind field set approach, it will be possible to allocate expected losses consistently to a specific contract. The invention also has the advantage that topographical and geographical peculiarities, such as local wind and storm corridors through geological structures (hills, etc.) can be captured correctly by their impact on ground. Such correlations with the topological form on ground can also be correlated by the inventive system by an appropriate correlation module, e.g., comprising one or more adaptable correlation parameters. For wind field cell zones located at different topological formations, different correlation modules can for example be used. For example, for wind field cell zones along a coast located lower than a certain distance above sea level can be determined by a specific correlation module. The determination of the wind field cells along a coast can for example be improved based additionally on storm events for example comprising a Sea, Lake and Overland Surges from Hurricanes (SLOSH) method or other available methods.

In one alternative embodiment, by means of the wind field profile, for each grid cell, an indexed value is generated multiplying the one-minute maximum sustained wind at each associated delocalized distributed measuring station by the assigned station weighting factor, integrating the indexed value across all associated delocalized distributed measuring station, and normalizing the values of the indexed values over the entire wind field profile. This alternative embodiment has, inter alia, the advantage that dynamic determination of the wind field and the forecasting of the storm impact parameters on a specific grid cell can be achieved with an improved accuracy and certainty.

In one alternative embodiment, if an indexed value is triggered that exceeds the predefined trigger index value, a payment transfer module is activated, wherein a parametric monetary payment is transferred upon activation from the payment transfer module to the risk-exposed units in the corresponding triggered grid cell. This alternative embodiment has, inter alia, the advantage that the present invention provides a parametric risk transfer and risk cover system that is capable of providing a fast transfer and disbursement of automated pooled resources and/or funds to assist with the extraneous expenses that entities incur in the immediate aftermath of a storm in a specific grid cell. Public prior art systems, in particular, can face liquidity challenges, as there can be a substantial delay in reimbursement from the federal government. Access to pre-agreed funds can provide resource and budgetary clarity and operational stability for risk transfer and risk cover systems during challenging times. The present invention utilizes geographically distributed weather stations to mirror the variant impacts of hurricanes on the ground, and allows for a rapid settlement after the event, when funds are needed the most.

In still another alternative embodiment, the predefined trigger index value and/or the station weighting factors assigned to the each grid cell for each measuring station are dynamically adjustable to trigger different events based on different characteristic sets of measuring parameters. This alternative embodiment has, inter alia, the advantage that the system allows for further automation of the monitoring operation, especially of its operation with regard to dynamically capturing different types of events and differentiating correlation of measured parameters.

In another alternative embodiment, the system comprises a pattern of distinct predefined trigger index values, triggered upon the simultaneous occurrence of the distinct predefined trigger values such as pattern of the grid cells, thereby detecting the occurrence of a defined event. The pattern for detecting of a defined event can for example trigger the occurrence of a storm event and/or tropical storm event and/or hurricane and/or typhoon and/or cyclone. These alternative embodiments have, inter alia, the advantage that the complex structure of a storm event in regard to its wind field and the dependency of the wind field on topological structures and geological formations on the ground can be captured and considered by the system distinctively. No prior art forecasting system shows any technical capability close to this. Further, this alternative embodiment has the capability to have an increased sensitivity for detecting storm events and rating the risk correctly.

In an alternative embodiment, a linking module comprises at least one adaptable event factor providing the spatial and/or temporal correlations for the measurements of different weather flow stations. This alternative embodiment has, inter alia, the advantage that the topographical and geographical peculiarities, such as local wind and storm corridors through geological structures (hills, etc.), can be captured correctly by their impact on ground. Such correlations with the topological form on ground can also be correlated by the inventive system by an appropriate correlation module, e.g., comprising one or more adaptable correlation parameters. For wind field cell zones located at different topological formations, different correlation modules can for example be used.

In another alternative embodiment, the predefined trigger index values can be determined based on historical datasets of corresponding portfolios of risk-exposed units on ground in the respective grid cell, wherein the predefined trigger index values are grid cell-specific and determined by providing a spatial high-resolution grid triggering based on cell-dependent trigger index values. Further, grid cell-dependent vulnerability factors can for example be automatically generated for on-ground risk-exposed units of a specific grid cell from the grid cell-dependent predefined trigger index values and the historical dataset of corresponding portfolios of risk-exposed units on ground. Finally, grid cell-dependent generalized insurance risks can for example be generated based on the vulnerability factors for on-ground risk-exposed units, triggering the activation of an automated insurance system. This embodiment variant has, inter alia, the advantage that the present invention provides a parametric risk transfer and risk cover solution that is capable of providing a rapid disbursement of pooled resources and/or funds to assist with the extraneous expenses that entities incur in the immediate aftermath of a storm in a specific grid cell. Public prior art systems, in particular, can face liquidity challenges, as there can be a substantial delay in reimbursement from the federal government. Access to pre-agreed funds can provide resource and budgetary clarity and operational stability of risk transfer and risk cover systems during challenging times. The present invention utilizes geographically distributed weather stations to mirror the variant impacts of hurricanes on the ground, and allows for a rapid settlement after the event, when funds are needed the most.

In a further alternative embodiment, by means of different correlation modules, wind-exposed cell zones along an even topological exposed rating scale can be generated that are located in a comparable inherent topology of the landscape and measured wind risk exposure based on historical wind data and/or the dynamic captured measuring data and/or the dynamically generated wind fields. Furthermore, the grid cells can be generated based on wind-exposed cell zones. The generation can for example additionally be improved by comprising a Sea, Lake and Overland Surges from Hurricanes (SLOSH) method or other appropriate prior art method. The invention also has the advantage that the topographical and geographical peculiarities, such as local wind and storm corridors through geological structures (hills, etc.), can be correctly captured by their impact on the ground. Such correlations with the topological form on the ground can also be correlated by the inventive system by an appropriate correlation module, e.g., comprising one or more adaptable correlation parameters. For wind field cell zones located at different topological formations, different correlation modules can for example be used. For instance, wind field cell zones along a coast located lower than a certain distance above sea level can be determined by a specific correlation module. The determination of the wind field cells along a coast can for example be improved based additionally on storm events for instance comprising a Sea, Lake and Overland Surges from Hurricanes (SLOSH) method or other available methods.

In a further alternative embodiment, the parametric risk transfer system is based on an automated resource pooling system for risk sharing of the storm risks of a variable number of the risk-exposed units by providing a dynamic self-sufficient risk protection for the risk-exposed units by means of the automated resource pooling system, wherein the resource pooling system comprises an assembly module to process risk-related units' data and provide the likelihood of said risk exposure for one or a plurality of the pooled risk-exposed units based on the risk-related component data, wherein the risk-exposed units are connected to the resource pooling system by means of a plurality of payment-receiving modules configured to receive and store payments from the risk-exposed units in order to pool their risks and resources, and wherein the event-driven core engine by triggering the grid cell specific risk-exposure parameter and/or the indexed value of the wind field profile exceeding a predefined trigger index value provides risk protection for a specific risk-exposed unit based on received and stored payments from the risk-exposed unit, and wherein if the the grid cell specific risk-exposure parameter and/or indexed value of the wind field profile exceeds the predefined trigger index value, a loss associated with the risk-exposed units of a triggered grid cell is distinctly covered by the resource pooling system by means of a parametric transfer of payments from the resource pooling system to the risk-exposed unit. The resource pooling system can for example comprise an assembly module to process risk-related component data and provide the likelihood of said risk exposure for one or a plurality of the pooled risk-exposed units, and wherein the receiving and preconditioned storage of payments from risk exposure components for pooling of their risks is dynamically determinable based on total risk and/or the likelihood of the risk exposure of the pooled risk-exposed units. The number of pooled risk-exposed units can for example be dynamically adaptable by means of the resource pooling system to a range where non-covariant occurring risks covered by the resource pooling system affect only a relatively small proportion of the fully pooled risk-exposed units at a given time. Upon each triggering of a grid cell specific risk-exposure parameter and/or an indexed value of the wind field profile exceeding the predefined trigger index value based on the measuring parameters indicating one of the defined storm events, a total parametric payment can for example be allocated with the triggering, wherein at least a first portion of the fully allocated payment is transferred upon triggering the excess of the trigger index value. This alternative embodiment has, inter alia, the advantage that the present invention provides a fully automated parametric risk transfer and risk cover system that is capable of providing a fast transfer and disbursement of pooled resources and/or funds to assist with the extraneous expenses that entities incur in the immediate aftermath of a storm in a specific grid cell. Public prior art systems, in particular, can face liquidity challenges, as there can be a substantial delay in reimbursement from the federal government. Access to pre-agreed funds can provide resource and budgetary clarity and operational stability of risk transfer and risk cover systems during challenging times. The present invention utilizes geographically distributed weather stations to mirror the variant impacts of hurricanes on the ground, and allows for a rapid settlement after the event, when funds are needed the most.

In addition to the system as described above and the corresponding method, the present invention also relates to a computer program product that includes computer program code means for controlling one or more processors of the control system such that the control system performs the proposed method; and it relates, in particular, to a computer program product that includes a computer-readable medium that contains the computer program code means for the processors.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will be explained in more detail, by way of example, in reference to the drawings, in which:

FIG. 2-8 are provided by the NOAA (National Oceanic and Atmospheric Administration) Hydrometeorological Prediction Center.

FIG. 3 shows a satellite picture of GOES-13 of hurricane Isaac approaching the coast of Louisiana at 1815 UTC on Aug. 28, 2012, when it reached its peak intensity of 70 kt.

FIG. 4 shows an example of observation data of sustained tropical storm-force or greater winds (kt) in the Gulf of Mexico and over the southeastern United States during Hurricane Isaac. All observation elevations are lower than 20 m.

FIG. 5 shows an example of observation data of tropical storm-force or greater wind gusts (kt) in the Gulf of Mexico and over the southeastern United States during Hurricane Isaac. All observation elevations are lower than 20 m.

FIG. 6 shows an example of estimated inundation data (feet above ground level) measured by USGS storm tide pressure sensors, USGS high-water marks, and NOS tide gauges in southeastern Louisiana for Hurricane Isaac.

FIG. 7 shows an example of rainfall accumulations from Hurricane Isaac and its remnants from Aug. 25-Sep. 3, 2012 measured courtesy of the National Weather Service Hydrometeorological Prediction Center in College Park, Md.

FIG. 8 shows examples of track forecasts for Hurricane Isaac, Aug. 21-Sep. 1, 2012 by different prior art systems (dashed lines, with 0, 12, 24, 36, 48, and 72 h positions indicated) wherein the reference number shows the results from (a) GFSI, (b) EMXI, (c) TVCA, and (d) FSSE. The best track in each case is given by the thick solid line with positions given at 6 h intervals.

DETAILED DESCRIPTION OF THE PREFERRED EMBODIMENTS

Figure 1:
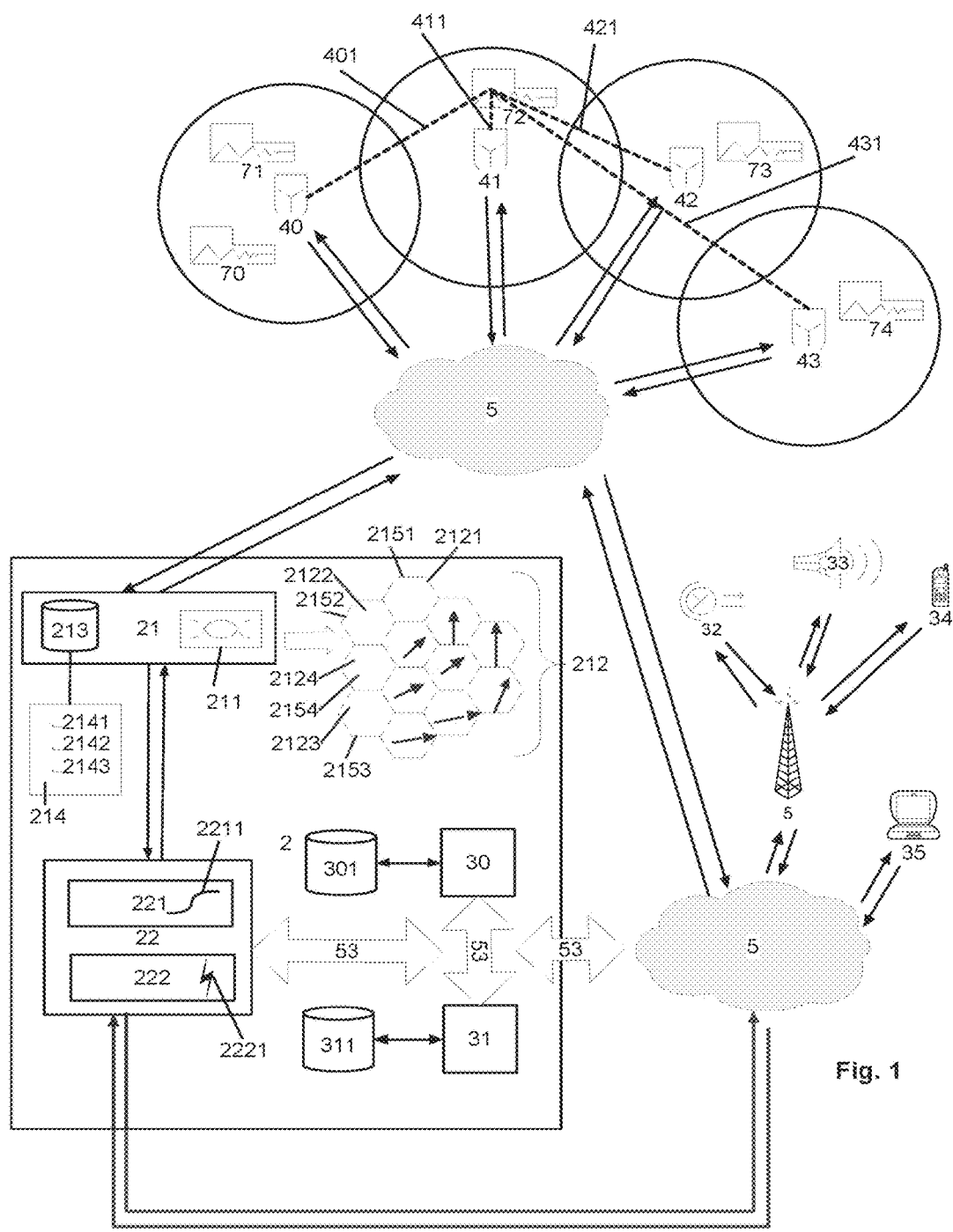
FIG. 1 shows a block diagram schematically illustrating an exemplary system 1 for automated location-dependent probabilistic tropical storm risk and storm impact forecast, wherein a spatial high-resolution grid 222 comprising grid cells 2221, 2222, 2223, 2224 is generated over a geographical area of interest by means of a capturing unit 12, said area including at least a portion of risk-exposed units 70-74 on the ground, wherein a plurality of delocalized distributed measuring stations 40-43 are selected and associated with the grid 122, and wherein each cell 1221, 1222, 1223, 1224 of the grid 122 has a defined distance from each of the delocalized distributed measuring stations 40-43. The measuring stations 40-43 can e.g. comprise land-based weather flow stations, satellite-based or plane-based or ship-based measuring devices.
Figure 2:
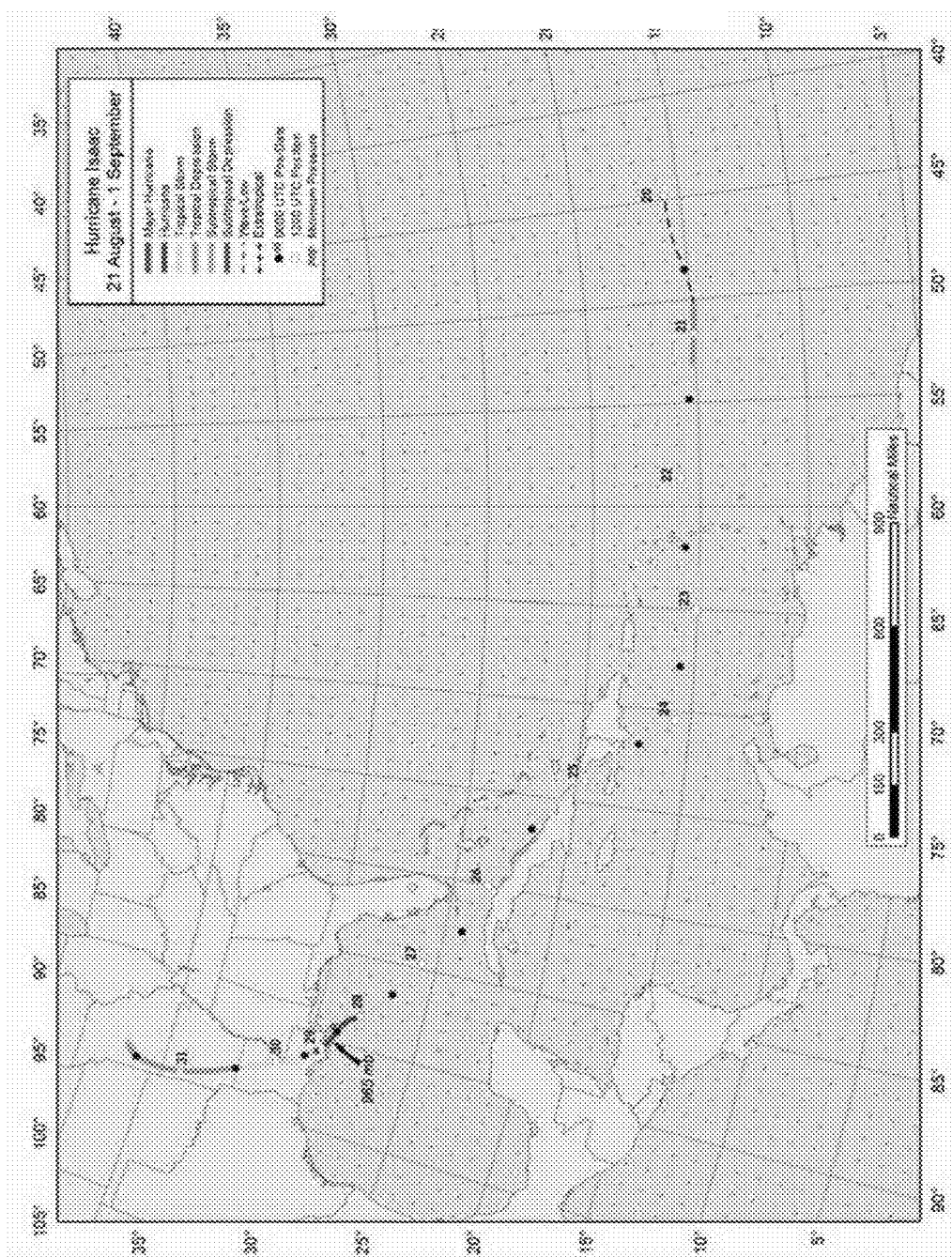
FIG. 2 shows a diagram schematically illustrating track positions of Hurricane Isaac, Aug. 21-Sep. 1, 2012.
Figure 3:
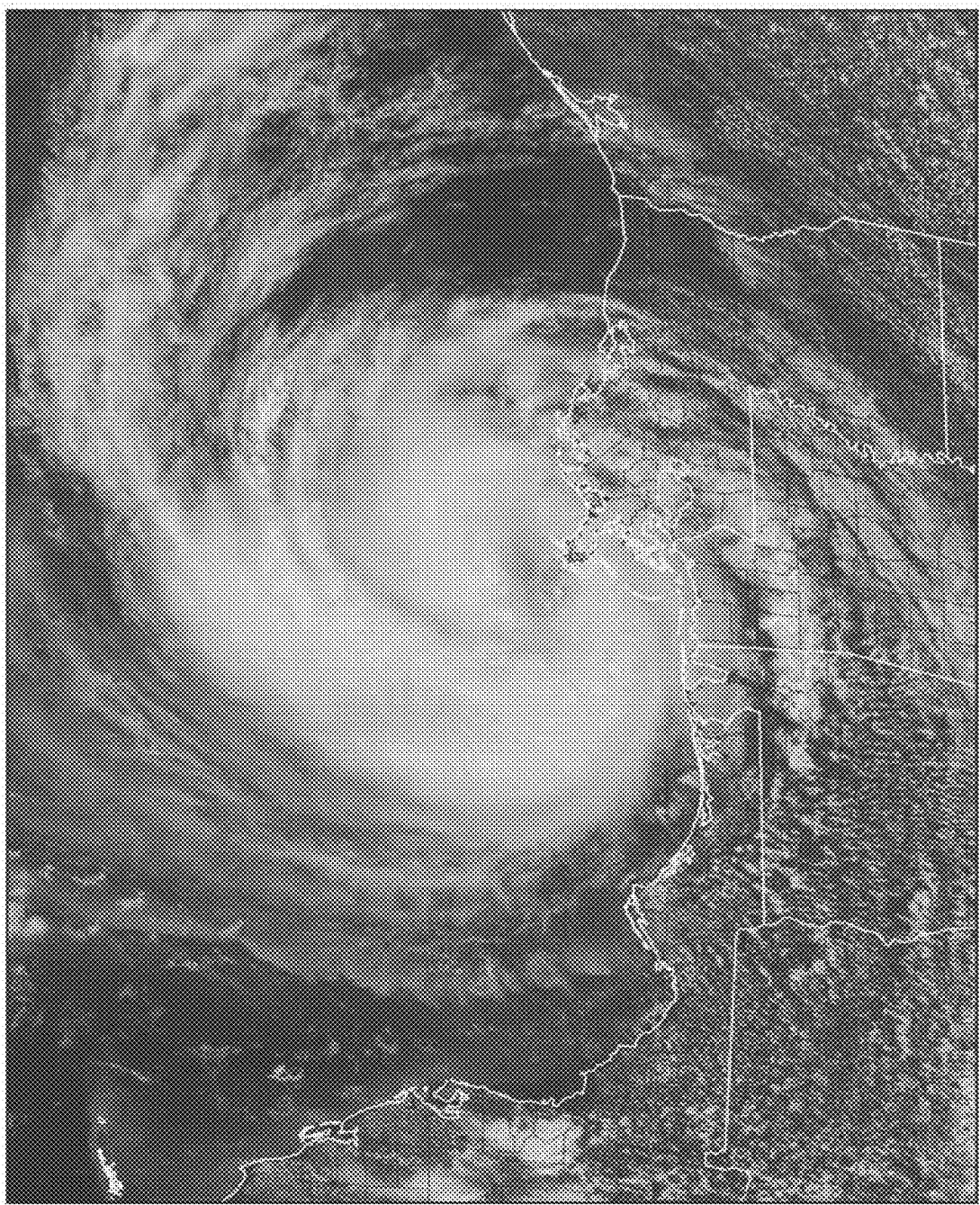
Figure 4:
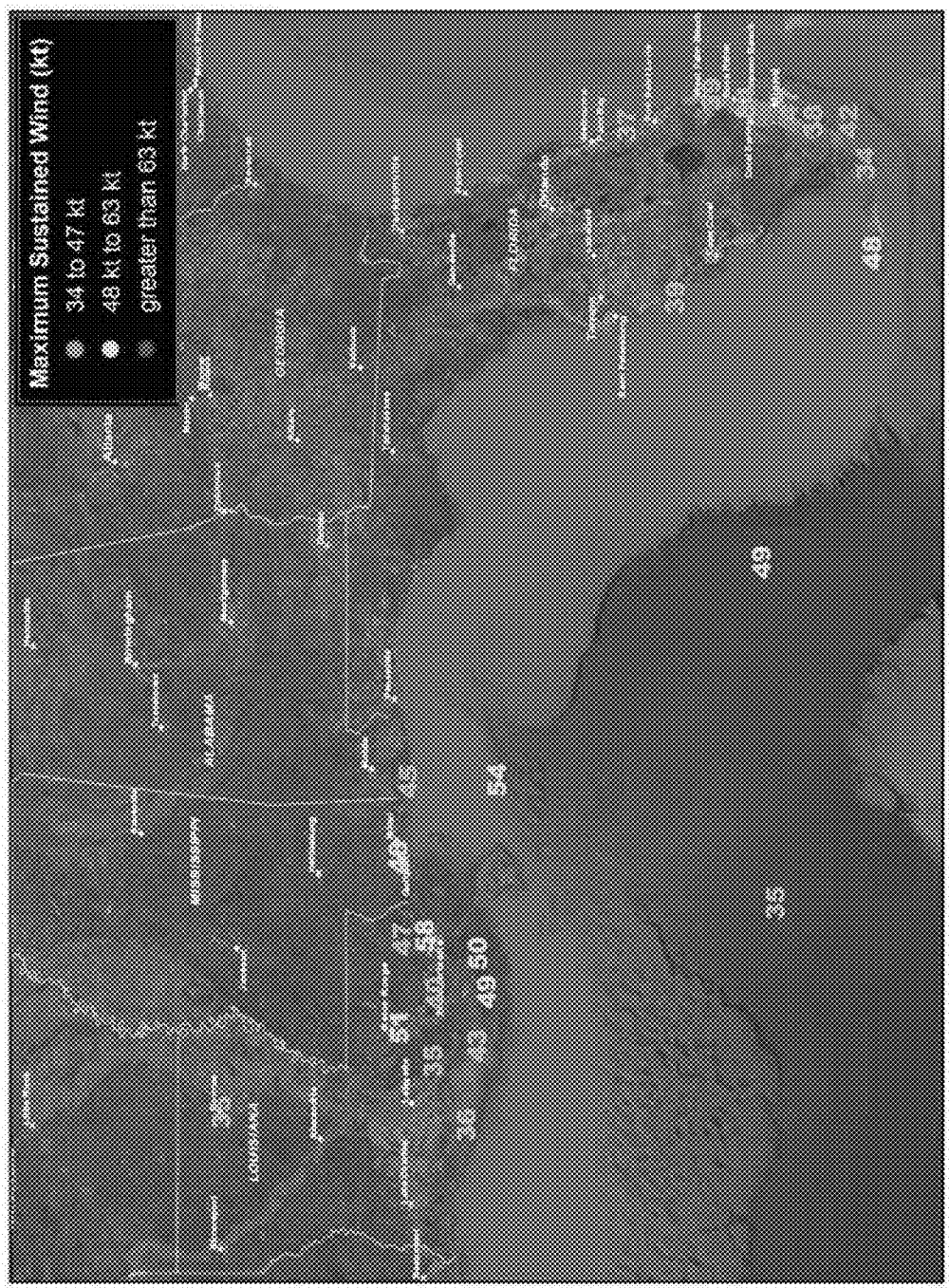
Figure 5:
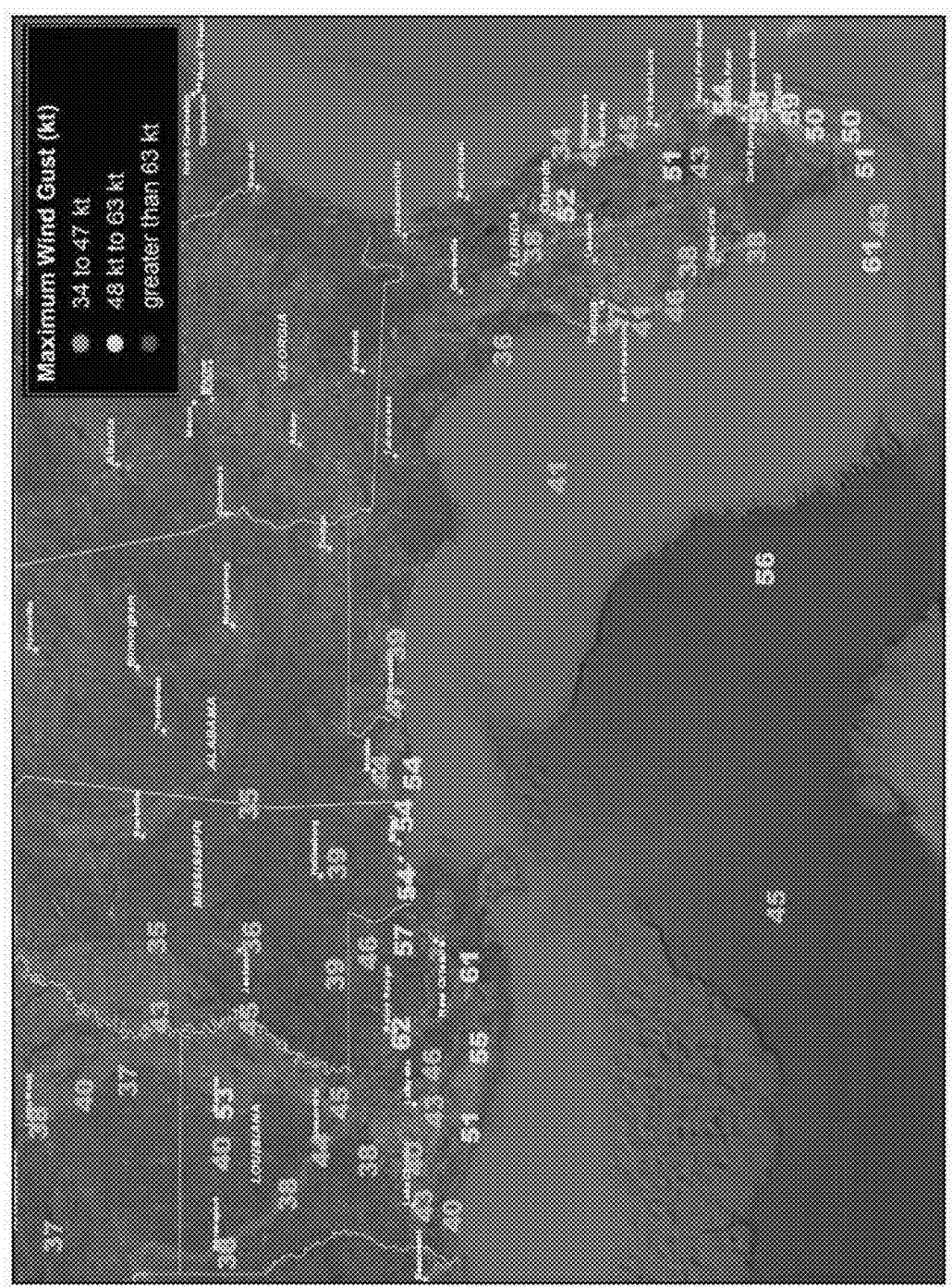
Figure 6:
Figure 7:
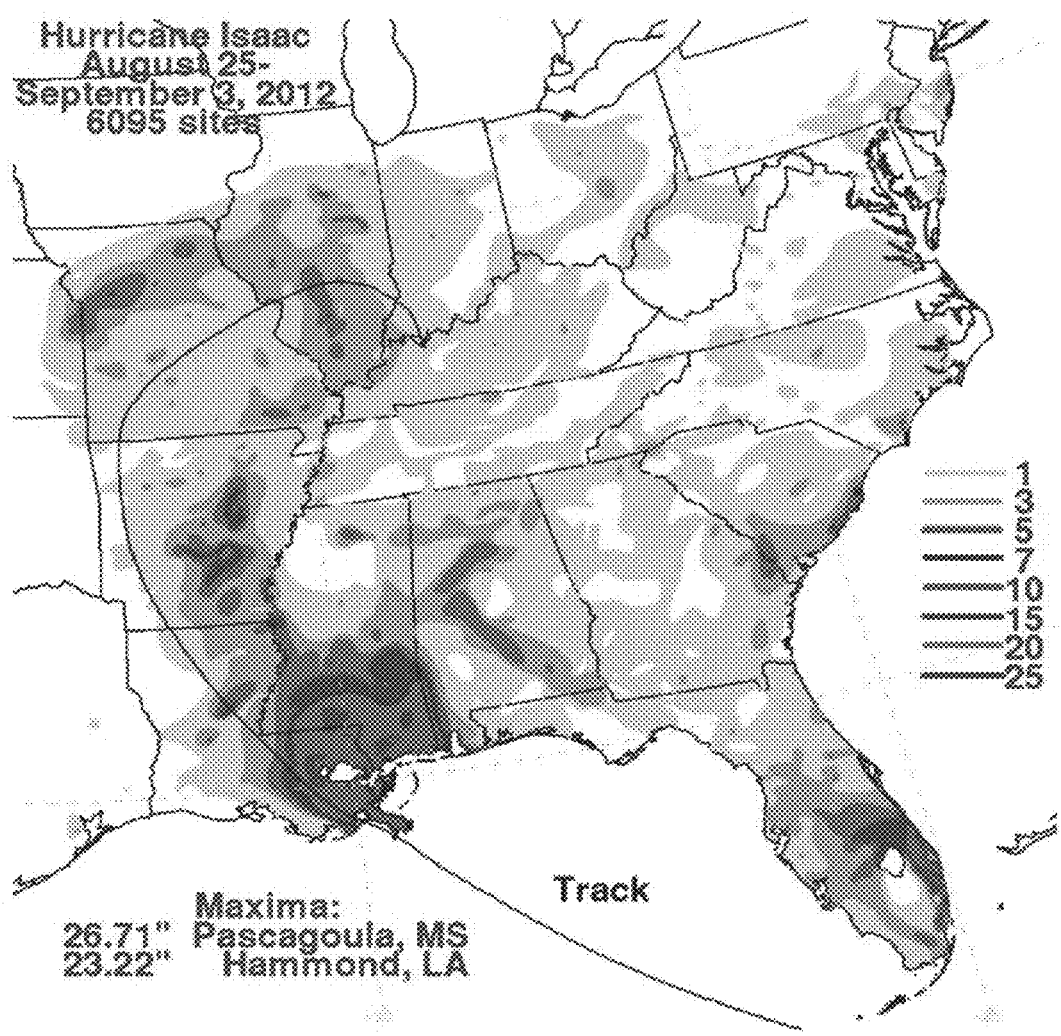
Figure 8:
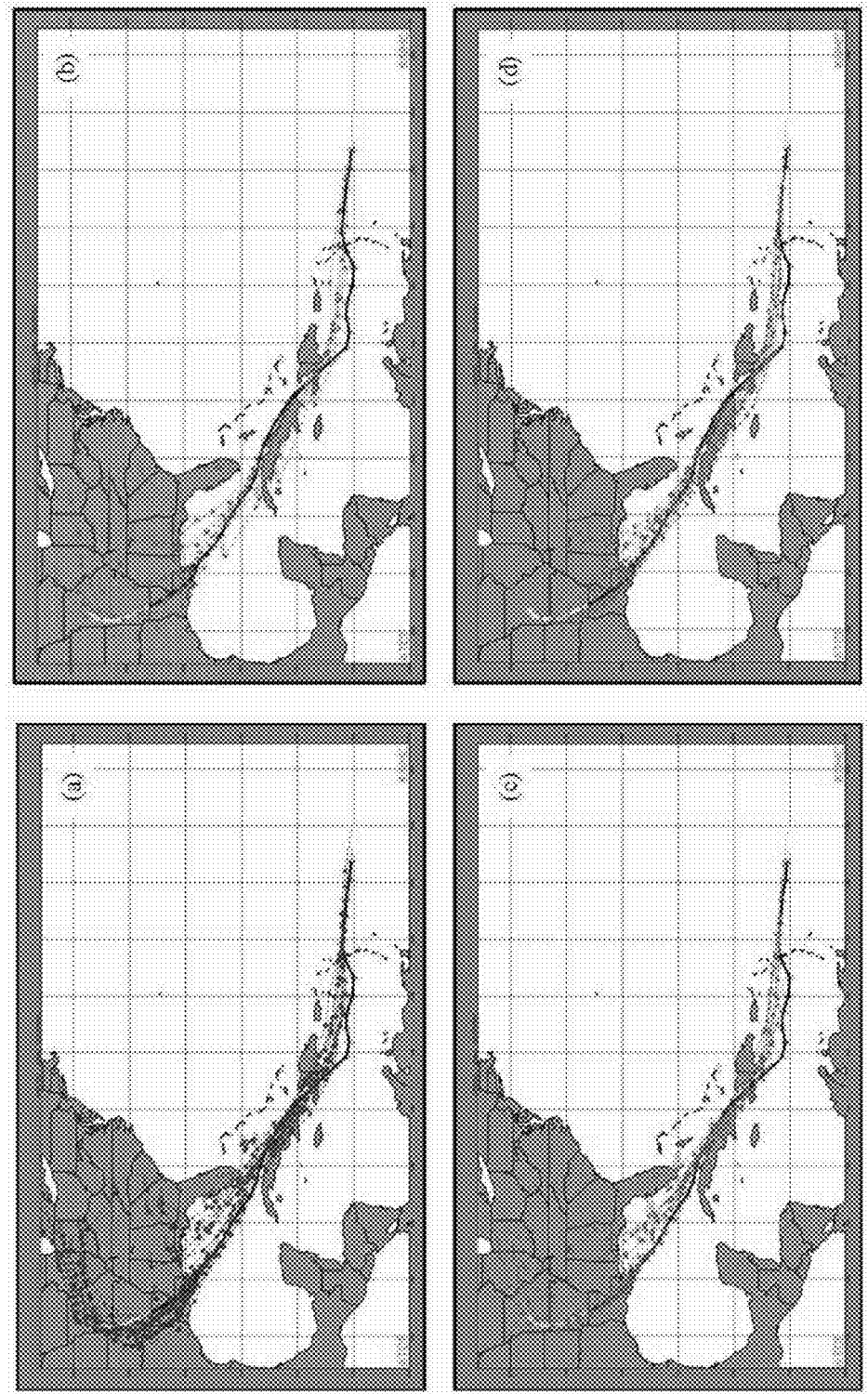

FIG. 1 schematically illustrates an architecture for a possible implementation of an embodiment of the system 1 for automated location-dependent probabilistic tropical storm wind, storm risk and storm impact forecasting on the ground and depending on local topological and geographical formations and structures. FIG. 1 also shows a corresponding automated parametric risk transfer system 1 based on automated location-dependent probabilistic tropical storm risk and storm impact forecasting.

Weather measuring parameters 401,402,403,404 of weather events 60, . . . ,64 are measured, recorded by means of a plurality of delocalized distributed measuring stations 40-43 and transmitted to a central system 2. The measuring stations 40-43 can e.g. comprise land-based weather flow stations, satellite-based or plane-based or ship-based measuring devices. The event-triggered system 1 and/or the central system 2 can include at least one processor and associated memory modules. The storm event-triggered system 1 can also include one or more display units and operating elements, such as a keyboard and/or graphic pointing devices, such as a computer mouse. The measured weather measuring parameters 401,402,403,404 can comprise at least measuring parameters 401,402,403,404 of wind speed and/or maximum wind speed within a predefined time frame. For data transmission, the delocalized distributed measuring stations 40-43 are bidirectional connected to the central system 2 by means of the data transmission network 5 or an appropriate data connection for data transport.

A spatial high resolution grid 212 comprising grid cells 2121, 2122, 2123, 2124 is generated over a geographical area of interest by means of a capturing unit 21, said area including at least a portion of risk-exposed units 70-74 on the ground, wherein a plurality of delocalized distributed measuring stations 40-43 are selected and associated with the grid 122. Each cell 1221, 1222, 1223, 1224 of the grid 122 has a defined distance from each of the delocalized distributed measuring stations 40-43. Measuring parameters 401,402,403,404 of the delocalized distributed measuring stations 40-43 associated with the grid 212 are transferred to the capturing unit 21 over the data transmission network 5 by means of a corresponding interface module of the central system 2 or the capturing unit 21 and of the associated and selected, delocalized distributed measuring stations 40-43. The capturing unit 21 comprises a memory store 213 with a searchable data table 214 wherein data records 2141, 2142, 2143, 2144 comprising transmitted measuring parameters 401,402,403,404 are stored that are assigned to the corresponding measuring station 40-43 by means of the searchable data table 214.

For each selectable grid cell 2121, 2122, 2123, 2124 and/or risk-exposed unit 70-74 based on the measuring station's 40-43 proximity, a station weighting factor 410, 411,412,413 can e.g. be assigned to each measuring station 40-43 having a higher value the closer a weather flow station 40-43 is to the grid cell 2121, 2122, 2123, 2124 and/or risk-exposed units 70-74. In FIG. 1, the reference numerals 401,411,421,431 illustrate the station weighting factors 410, 411,421,431 assigned to the risk-exposed unit 72 based on the proximity. The proximity can be based on the distance and/or airline or beeline and/or elevation and/or geo-structural parameters of the risk-exposed unit 70, . . . ,74 and/or measuring station 40-43.

Using a core engine 211, indexed wind field parameters 2151, 2152, 2153, 2154 are dynamically generated for different capturing time frames according to the spatial high-resolution grid 212 and associated with a wind field profile 215, wherein for each grid cell 2121, 2122, 2123, 2124 of the wind field profile 215, the wind field parameters 410,411,412,413 are determined based on the transmitted measuring parameters 401,402,403,404, summing up the transmitted measuring parameters 401,402,403,404 of the data records 2141, 2142, 2143, 2144 over all or a plurality of the measuring stations 40-43 weighted by the station weighting factor assigned to the corresponding measuring station 40-43 and grid cell 2121, 2122, 2123, 2124, and normalized over all of the grid cells 2121, 2122, 2123, 2124. For example, by means of the wind field profile 215, for each grid cell 2121, 2122, 2123, 2124, the indexed value 2151, 2152,2153, 2154 is generated by multiplying the one-minute maximum sustained wind at each associated delocalized distributed measuring station 40-43 by the assigned station weighting factor 410,411,412,413, integrating the indexed value 2151, 2152,2153, 2154 across all associated delocalized distributed measuring station 40-43, and normalizing the values of the indexed values 40-43 over the entire wind field profile 215. Alternatively, it may be preferable for the weather measuring parameters 401,402,403,404 to be measured and/or determined in a low spatial resolution in relation to the grid 212 of a wind field profile 215. Such low spatial resolution of the measurements 401,402,403,404 can be achieved by an appropriate number of associated delocalized distributed measuring stations 40-43 and/or by extension of the weather measuring parameter 401,402,403, 404 by measurements of other sources of measuring parameters measured by other devices, such as the distributed measuring station 40-43, for example airplane measuring data and/or satellite-based measuring data. Such data sources can for example includes geographical information defining the tracks of the respective historical storms and intensity data to indicate the strength of the storm. One source of such data may for example be the National Hurricane Center ("NHC"), which is part of the National Oceanic and Atmospheric Administration ("NOAA"), which is the source of FIGS. 2-8. Data from historical storms can also be accomplished by generating the alternative storm tracks and wind development distributions, wherein a plurality of alternative pressure evolutions are generated for the historical and alternative tracks. Producing the alternative storm tracks, and the alternative pressure evolutions for the historical and alternative tracks, can create a relatively large additional source of storms (both historical and alternative).

Related to the above improvements, further, minimum pressures based on the sea surface temperature (SST) climatology can be added to the data records 2141, 2142, 2143, 2144. In other words, for each location in the grid, the lowest pressure associated with the highest SST ever observed in that particular location is entered. This value acts as a "floor" for alternative pressure values associated with each location in the grid that may be selected (as discussed in additional detail below) in connection with alternative pressure evolutions for the storm event 60, . . . ,64 development. After adding minimum pressures, the pressure climatology and/or the indexed wind field parameters 2151, 2152, 2153, 2154 of the wind field 215 can for example be smoothed. The goals of the smoothing process include one or more of the following: to obtain full coverage of the area of interest; to smooth variations in the distributions of pressures, wind field parameters, such as wind speed, and wind and pressure derivatives from one grid to its neighboring grids; to smooth variations in distributions of minimums, maximums and means of the absolute wind speed, pressures and derivatives; and to obtain the same number of "observations" at each grid location. This smoothing process leads to a more consistent set of wind field-related values for the area of interest to be used in a sampling process that will be described in more detail below. In the particular embodiment being described, the quantities to be smoothed are not scaler quantities (such as a mean wind parameter or pressure quantity at each location), but rather are wind parameter-related distributions for each location. Accordingly, the smoothing process is relatively more complex.

On the other hand, the system 1 can for example also generate an aggregated high-resolution grid level for said geographical area or territory or grid cell 2121, 2122, 2123, 2124 based upon the low spatial resolution by the weather flow stations 40-43. The weather measuring parameter 401, 402,403,404 can for example be measured and/or determined in a high temporal resolution by means of the assigned distributed measuring station 40-43. This allows a dynamic real-time capturing and risk forecast or determination by the system 1. The indexed wind field parameters 2151, 2152, 2153, 2154 associated of the wind field profile 215 can for example be derived based on at least the weather measuring parameter 401,402,403,404 and topological parameters and/or geo-structural factors. The station weighting factors 410,411,412,413 can for example be generated at least on the horizontal distance and/or elevation difference with respect to the corresponding grid cell 2121, 2122, 2123, 2124. Further, the indexed values 2151, 2152, 2153, 2154 can for example be derived by an interpolation module based on a country-specific wind zone table depending on horizontal distance and/or elevation difference.

Alternatively, the predefined trigger index values 2211 can for example be determined based on the historical dataset of corresponding portfolios of risk-exposed units 70-74 on the ground in the respective grid cell 2121, 2122, 2123, 2124, wherein the predefined trigger index values 2211 are determined grid cell-specific providing a spatial high resolution grid 212 triggering based on cell-specific trigger index values 2211. The predefined trigger index values 2211 can for example also be improved by determining them based on the historical dataset of corresponding portfolios of risk-exposed units 70-74 on the ground in the respective grid cell 2121, 2122, 2123, 2124, wherein the predefined trigger index values 2211 and/or station weighting factors 410,411,412,413 are grid cell-specific determined providing a spatial high-resolution grid 212 triggering based on cell-specific trigger index values 2211. Furthermore, grid cell 2121, 2122, 2123, 2124 dependent vulnerability factors can for example be automatically generated for on-ground risk-exposed units 70, . . . ,74 of a specific grid cell from the grid cell 2121, 2122, 2123, 2124 dependent predefined trigger index values 2211 and the historical dataset of corresponding portfolios of risk-exposed units 70, . . . ,74 on the ground.

By triggering a grid cell specific risk-exposure parameter and/or an indexed wind field parameter 2151, 2152,2153, 2154 of the wind field profile 215 exceeding a predefined trigger index 2211 value by means of a trigger module 221, an output activation signal 2221 is generated by the signal generator 222 based on the triggered excess of the grid cell specific risk-exposure parameter and/or the indexed windfield value and transmitted to at least one associated activation device 30, . . . ,35. The operation of the activation device 30, . . . ,35 is steered by the transmitted output activation signal 2221. The activation device 30, . . . ,35 can for example comprise automated risk transfer units 30,31, especially coupled first 30 and second 31 risk transfer units. The complementary switched risk transfer units 30,31 are active and complementary switched by the output activation signal 2221 of the signal generator 222. The signal generator 222 can also be coupled to automated alarm systems 33, distributed in the grid cells 2121, 2122, 2123, 2124 and dynamically activated based on the development of the grid cell specific risk-exposure parameters and/or the indexed wind field parameters 2151, 2152, 2153, 2154 of the wind field profile 215. Furthermore, the signal generator 222 can be coupled to an automated message system 34, where upon triggering excess of the indexed value in a grid cell 2151, 2152, 2153, 2154, the signal generator 222 generates and transmits appropriate alarm messages dynamically to message receiving devices, such as mobile telephones, associated with the spatial high-resolution grid 212 or the grid cells 2121, 2122, 2123, 2124. Finally, the system 1 can by coupled by the signal generator 222 to any other automated activatable device, such as water gate locks, etc., to steer those devices within the grid cells 2121, 2122, 2123, 2124 dynamically based on changing conditions in the wind field profile 215 or the indexed wind field parameters 2151, 2152, 2153, 2154. The predefined trigger index value 2211 and/or the station weighting factors 401,411,421,431 assigned to each grid cell 2121, 2122, 2123, 2124 for each measuring station 40-43 can for example be dynamically adjustable to trigger different events based on different characteristic sets of measuring parameters. The system 1 can comprise a pattern of a plurality of distinct predefined trigger index values 2211, triggering on the simultaneous occurrence of the distinct predefined trigger index values 2211 as a pattern of the grid cells 2121, 2122, 2123, 2124, thereby detecting the occurrence of a defined event. Said pattern for detecting a defined event can for example trigger the occurrence of a storm event and/or tropical storm event and/or hurricane and/or typhoon and/or cyclone. Furthermore, a wind field profile 215 of each data record can be generated, and a probability is assigned by an interpolation module to each point in said spatial high-resolution grid 212, giving the probability and/or risk of the occurrence of a specific wind strength at a given geographical location and time.

Correlations can by captured dynamically by the system 1. For example, a linking module of the system 1 can comprise at least one adaptable event factor providing the spatial and/or temporal correlations for the measurements of different measuring stations 40-43. In addition, using different correlation modules, wind-exposed cell zones along an even topological exposed rating scale are generated located in a comparable inherent topology of the landscape and wind risk exposure is measured based on historical wind data and/or the dynamic captured measuring data and/or the dynamically generated wind fields 212. As a result, the generation of the grid cells 2121, 2122, 2123, 2124 can be performed based on wind-exposed cell zones. The generation can for example also additionally be improved by means of a Sea, Lake and Overland Surges from Hurricanes (SLOSH) method or any other appropriate prior art method for forecasting and estimating storm event exposure, storm risks and the behavior of storm events 60, . . . ,64.

As an alternative embodiment, upon triggering of grid cell specific risk-exposure parameters and/or indexed values 2151, 2152,2153, 2154 in excess of the predefined trigger index value 2211, a payment transfer module of the activation device 30/31 is activated, wherein a parametric monetary payment is transferred upon activation from the payment transfer module to the risk-exposed units 70-74 in the corresponding triggered grid cell 2121, 2122, 2123, 2124. For example, grid cell 2121, 2122, 2123, 2124 dependent generalized risk transfer or insurance risks are generated by means of the system 1 based upon the vulnerability factors for on-ground risk-exposed units 70, . . . ,74, triggering the activation of an automated risk transfer system 30,31. The parametric risk transfer system 1 can for example be based on an automated risk transfer unit 30 with a resource pooling system 301 for sharing the storm risks of a variable number of the risk-exposed units 70, . . . ,74 by providing dynamic self-sufficient risk protection for the risk-exposed units 70, . . . ,74 by means of the automated resource pooling system 301. The resource pooling system 301 can comprise an assembly module to process risk-related units' data 2141, 2142, 2143, 2144 and provide the likelihood of said risk exposure for one or a plurality of the pooled risk-exposed units 70, . . . ,74 based on the risk-related component data 2141, 2142, 2143, 2144. The risk-exposed units 70, . . . ,74 can be connected to the resource pooling system 30 by a plurality of payment-receiving modules configured to receive and store payments from the risk-exposed units 70, . . . ,74 in order to pool their risks and resources. The event-driven trigger module 221 is triggering the grid cell specific risk-exposure parameters and/or the indexed wind field parameters 2151, 2152, 2153, 2154 of the wind field profile 212 exceeding a predefined trigger index 2211 to provide risk protection for a specific risk-exposed unit 70, . . . ,74 based on received and stored payments from the risk-exposed unit 70, . . . ,74. If the grid cell specific risk-exposure parameters and/or the indexed wind field parameters 2151, 2152, 2153, 2154 of the wind field profile 215 exceed the predefined trigger index value 2211, a loss associated with the risk-exposed units 70, . . . ,74 of a triggered grid cell 2121, 2122, 2123, 2124 is distinctly covered by the resource pooling system 301 through a parametric transfer of payments from the resource pooling system 301 and the automated risk transfer unit 30 to the risk-exposed unit 70, . . . ,74. Thus, the parametric risk transfer and/or insurance system provides a fast, secure transfer and rapid disbursement of the pooled resources to assist with the extraneous expenses that entities incur in the immediate aftermath of a storm event 60, . . . ,64. Public entities, in particular, face liquidity challenges, as there may be a substantial delay in reimbursement from the federal government. Access to pre-agreed resources can provide budgetary clarity and stability during challenging times. The invention utilizes geographically distributed weather stations to mirror the variant impacts of hurricanes on the ground, and allows for a rapid settlement after the event, when resources are needed the most. The number of pooled risk-exposed units 70, . . . ,74 can be dynamically adaptable by means of the automated risk transfer unit 30 with the resource pooling system 301 to a range where non-covariant occurring risks covered by the resource pooling system 301 affect only a relatively small proportion of the fully pooled risk-exposed units 70, . . . ,74 at a given time. Each time a grid cell specific risk-exposure parameter and/or an indexed wind field parameter 2151, 2152, 2153, 2154 of the wind field profile 215 is triggered that exceeds the predefined trigger index 2211 based on the weather measuring parameters 401,402,403,404 and/or the data records 2141, 2142, 2143, 2144 indicating one of the defined storm events 60, . . . ,64, a total parametric payment is allocated with the triggering, wherein at least a first portion of the totally allocated payment is transferred upon triggering the excess of the trigger index 2211 or the trigger indices 2211. Alternatively, the parametric risk transfer system 1 can provide a dynamic, self-sufficient risk protection structure for a variable number of defined risk exposure components 70, . . . ,74. In this alternative, the risk exposure components 70, . . . ,74 are connected to the risk transfer unit 30 of the weather-event triggered system 1 by transferring risk exposure associated with the occurrence of the defined storm risk events 60, . . . ,64 from the risk exposure components 70, . . . ,74 to the risk transfer unit 30 by means of equitable, mutually aligned first risk transfer parameters and correlated aligned first payment transfer parameters to the automated resource pooling system 301 for pooling electronic payment parameters. Further, the risk transfer unit 30 is connected to a second risk transfer unit 31 with a second automated resource pooling system 311 by means of the signal generator 222 of the storm event-triggered system 1 by transferring risk exposure associated with the occurrence of the defined storm risk events 60, . . . ,64 from the risk transfer unit 30 to the second risk transfer unit 31 by means of equitable, mutually aligned second risk transfer parameters and correlated aligned second payment transfer parameters at least partially transferring resources from the resource pooling system 301 to the second resource pooling system 302. For this alternative, if one of the defined storm risk events 60, . . . ,64 occurs, loss parameters measuring the loss at the risk exposure components 70, . . . ,74 are captured and transmitted to the risk transfer unit 30, in which the loss that has occurred is automatically covered by the risk transfer unit 30 and/or the second risk transfer unit 31 activated by means of the output activation signal 2221 generated by the signal generator 222 based on the equitable, mutually aligned second risk transfer parameters.

The resource pooling systems 301/311 and the automated risk transfer units 30/31, as well as the other activation devices 33-35, are technical devices comprising electronic means that can be used by service providers in the field of risk transfer or insurance technology for the purpose of risk transfer as it relates to the occurrence of measurable storm risk events 60-64. The invention seeks to capture, handle and automate, by complex technical means, related operations of the automated risk transfer or insurance systems 30, 31, in particular in an effort to optimize the interaction of coupled systems 30, 31, and to reduce the operational requirements. Another aspect that is addressed is finding ways to synchronize and adjust such operations related to coupling or switching of resource pooling systems 301, 311, which are directed at proven risk protection for risk-exposed units based on technical means. Unlike the standard practice, the resource pooling systems 301, 311 also achieve reproducible, dynamically adjustable operations with the desired technical, repeating accuracy, because they are completely based on technical means, a process flow and process control/operation. Furthermore, as mentioned, the risk-exposed components 70, . . . ,74, etc. are connected to the risk transfer unit 30 and resource pooling system 301 by means of the plurality of payment transfer modules that are configured to receive and store payments from the risk exposed components 70, . . . ,64 for pooling their risks in a payment data store. The payments can be stored by transferring and storing component-specific payment parameters. The payment amount can be determined dynamically using the resource pooling system 301 based on total risk of the overall pooled risk exposure components 70, . . . ,74. For the resource pooling, the system 1 can comprise a monitoring module that requests a periodic payment transfer from the risk exposure components 70, . . . ,74, etc. to the resource pooling system 301 by means of the payment transfer module, wherein the risk protection for the risk exposure components 70, . . . ,71 is interrupted by the monitoring module, when the periodic transfer is no longer detectable by means of the monitoring module. In one alternative embodiment, the request for periodic payment transfers is automatically interrupted or waived by the monitoring module, when the occurrence of risk event indicators is triggered in the data flow pathway of a risk exposure component 70, . . . ,74. Similarly, the first risk transfer unit 30 with the resource pooling system 301 can be connected to a second risk transfer unit 31 with a second resource pooling system 311 by means of a second payment transfer module that is configured for receiving and storing payments from the resource pooling system 301 of the first risk transfer unit 30 or insurance unit 30 for the transfer of risks associated with the pooled risk and risk exposures, respectively, of the risk exposure components 70, . . . ,74 from the first risk transfer unit 30 to the second risk transfer unit 31. The coupling and switching of the two complementary, autonomously operated risk transfer units 30,31 with the resource pooling systems 301,311 is achieved by the event-triggered signal processing unit 22 by means of the signal generator 222 for generating and transmitting appropriate steering signals to the first and second risk transfer units 30,31 and resource pooling systems 301, 311, respectively. As indicated in FIG. 1, the storm event-triggered system 1 includes a data storing module for capturing the risk-related weather measuring parameters 401,402,403,404, risk-related data of the risk-exposed units 70, . . . ,74 and multiple functional modules; e.g., namely the payment transfer modules, the trigger module 221, the signal generator 222, the core engine 211, the aggregation module or the capturing unit 21. The functional modules can be implemented at least partly as programmed software modules stored on a computer-readable medium, connected in a fixed or removable manner to the processor(s) of the storm event-triggered system 1 or to associated automated units 30,31. One skilled in the art understands, however, that the functional modules can also be implemented fully using hardware components, units and/or appropriately implemented modules. As illustrated in FIG. 1, the storm event-triggered system 1 and its components, in particular the first and second resource pooling systems 301, 311, the capturing unit 21, the trigger module 221, the weather measuring stations 40, . . . ,43 with the interfaces, the aggregation module, and the payment transfer modules can be connected by means of a network 5, such as a telecommunications network or any other data transmission network. The network 91 can include a hard-wired or wireless network; e.g., the Internet, a GSM network (Global System for Mobile Communication), a UMTS network (Universal Mobile Telecommunications System) and/or a WLAN (Wireless Local Region Network), and/or dedicated point-to-point communication lines. In any case, the technical electronic money-related setup for the present system comprises adequate technical, organizational and procedural safeguards to prevent, contain and detect threats to the security of the structure, particularly counterfeiting threats. The resource pooling systems 301, 311 furthermore comprise all of the necessary technical means for electronic money transfer and link-up association, e.g., as initiated by one or more associated payment transfer modules via an electronic network. The monetary parameters can be based on any possible electronic transfer means, such as e-currency, e-money, electronic cash, electronic currency, digital money, digital cash, digital currency, or cyber currency, etc., which can only be exchanged electronically. The first and second payment data stores 61, 62 provide the means for associating and storing monetary parameters associated with a single one of the pooled risk exposure components 21, 22, 23. The present invention can involve the use of the aforementioned networks, such as computer networks or telecommunication networks, and/or the internet and digital stored value systems. Electronic funds transfer (EFT), direct deposit, digital gold currency and virtual currency are further examples of electronic money modalities. Also, transfers can involve technologies such as financial cryptography and technologies for enabling such transfers. For transactions involving monetary parameters, it is preferable to use hard electronic currency, without the technical possibilities of disputing or reversing charges. The resource pooling systems 101, 121 for example support non-reversible transactions. The advantage of this arrangement is that the operating costs of the electronic currency system are greatly reduced by not having to resolve payment disputes. This also makes it possible for electronic currency transactions to clear instantly, making the funds available to the systems 10, 12 immediately. This means that using hard electronic currency is rather akin to a cash transaction. However, it is also conceivable to use soft electronic currency, such as currency that allows for the reversal of payments, for example having a "clearing time" of 72 hours, or the like. The electronic monetary parameter exchange method applies to all connected systems and modules related to the resource pooling systems 101, 121 of the present invention, such as the first and second payment transfer modules. The monetary parameter transfer to the first and second resource pooling system 101, 121 can be initiated by a payment transfer module or upon request by the related resource pooling system 101 or 121.

LIST OF REFERENCE SIGNS

1 Parametric risk transfer system
2 Central system
21 Capturing unit
211 Core engine
212 Spatial high-resolution grid
2121, 2122, 2123, 2124 Grid cells
213 Memory store
214 Searchable data table
2141, 2142, 2143, 2144 Data records with transmitted measuring parameters
215 Wind field profile
2151, 2152, 2153, 2154 Indexed wind field parameters
22 Signal processing unit
221 Trigger module
2211 Predefined trigger index
222 Signal generator
2221 Output activation signal
30, . . . ,35 Activation device
3o First automated risk transfer unit
301 First automated resource pooling system
31 Second automated risk transfer unit
311 Second automated resource pooling system
40-43 Weather flow stations
401,402,403,404 Weather measuring parameters
410,411,412,413 Station weighting factors
5 Data transmission network
60-64 Weather events/storm events
70-74 Risk-exposed units

The invention claimed is:

1. A parametric risk transfer system based on automated location-dependent probabilistic tropical storm risks and storm impact forecast and determination, wherein weather measuring parameters of weather events are measured, recorded by means of a plurality of delocalized distributed measuring stations and transmitted to a central system, and wherein the measured weather measuring parameters at least comprise measuring parameters of wind speed and/or maximum wind speed within a predefined time frame, wherein
  a spatial high-resolution grid comprising grid cells is generated over a geographical area of interest by means of a capturing unit, said area including at least a portion of risk-exposed units on the ground, wherein a plurality of delocalized distributed measuring stations are selected and associated with the grid, and wherein each cell of the grid has a defined distance from each of the delocalized distributed measuring stations,
  measuring parameters of the delocalized distributed measuring stations associated with the grid are transferred to the capturing unit via a data transmission network, wherein the capturing unit comprises a memory store with a searchable data table wherein data records comprising transmitted measuring parameters are stored assigned to the corresponding measuring station by the searchable data table,
  by means of a core engine, indexed wind field parameters are dynamically generated for different capturing time frames according to the spatial high-resolution grid and associated with a wind field profile, wherein for each grid cell of the wind field profile, the wind field parameters are determined based on the transmitted measuring parameters or data records, summing up the transmitted measuring parameters of all measuring stations weighted by a station weighting factor assigned to the corresponding measuring station and grid cell, and normalized over all of the grid cells, grid cell specific risk-exposure parameters are generated by means of the system based upon the indexed wind field parameters of the wind field profile, and by triggering a grid cell specific risk-exposure parameter exceeding a predefined trigger index value by means of a trigger module, an output activation signal is generated by the signal generator based on the triggered excess of the grid cell specific risk-exposure parameter and transmitted to at least one associated activation device, wherein the operation of the activation device is steered by the transmitted output activation signal.

2. The parametric risk transfer system according to claim 1, wherein using the wind field profile, for each grid cell an indexed value is generated by multiplying an one-minute maximum sustained wind at each associated delocalized distributed measuring station by the assigned station weighting factor, integrating the indexed value across all associated delocalized distributed measuring stations, and normalizing the values of the indexed values over the entire wind field profile.

3. The parametric risk transfer system according to claim 1, wherein if grid cell specific risk-exposure parameters and/or indexed values are triggered in excess of the predefined trigger index value, a payment transfer module of the activation device is activated, wherein a parametric monetary payment is transferred upon activation from the payment transfer module to risk-exposed units in the corresponding triggered grid cell.

4. The parametric risk transfer system according to claim 1, wherein the predefined trigger index value and/or the station weighting factors assigned to the each grid cell for each measuring station are dynamically adjustable to trigger different events based on different characteristic sets of measuring parameters.

5. The parametric risk transfer system according to claim 1, wherein the system comprises a pattern of distinct predefined trigger index values, triggering on the simultaneous occurrence of the distinct predefined trigger index values as specific pattern given by the grid cells, thereby detecting the occurrence of a defined event.

6. The parametric risk transfer system according to claim 5, wherein the pattern for detecting a defined event triggers the occurrence of a storm event and/or tropical storm event and/or hurricane and/or typhoon and/or cyclone.

7. The parametric risk transfer system according to claim 1, wherein a wind field profile of each data record is generated, and a probability is assigned by an interpolation module to each point in said spatial high resolution grid, giving the probability of the occurrence of a specific wind strength at a given geographical location and time.

8. The parametric risk transfer system according to claim 1, wherein a linking module comprises at least one adaptable event factor providing the spatial and/or temporal correlations for the measurements of different measuring stations.

9. The parametric risk transfer system according to claim 1, wherein the weather measuring parameters are measured and/or determined in a low spatial resolution in relation to a grid of a wind field profile.

10. The parametric risk transfer system according to claim 9, wherein the system generates, based upon the low spatial resolution by weather flow stations, an aggregated high-resolution grid level for said geographical area or territory and/or grid cell.

11. The parametric risk transfer system according to claim 1, wherein the weather measuring parameters are measured and/or determined in a high temporal resolution by means of the assigned distributed measuring station.

12. The parametric risk transfer system according to claim 1, wherein the indexed wind field parameters associated with the wind field profile are derived based on at least the weather measuring parameter and topological parameters and/or geo-structural factors.

13. The parametric risk transfer system according to claim 1, wherein the station weighting factors are generated at least on the horizontal distance and/or elevation difference with respect to the corresponding grid cell.

14. The parametric risk transfer system according to claim 1, wherein the indexed values are derived by an interpolation module based on a country-specific wind zone table depending on horizontal distance and/or elevation difference.

15. The parametric risk transfer system according to claim 1, wherein predefined trigger index values are determined based on a historical dataset of corresponding portfolios of risk-exposed units on the ground in the respective grid cell, wherein the predefined trigger index values and/or station weighting factors are grid cell-specific determined, providing a spatial high-resolution grid triggering based on cell-specific trigger index values.

16. The parametric risk transfer system according to claim 1, wherein grid cell dependent vulnerability factors are automatically generated for on-ground risk-exposed units of a specific grid cell from the grid cell dependent predefined trigger index values and a historical dataset of corresponding portfolios of risk-exposed units on the ground.

17. The parametric risk transfer system according to claim 15, wherein grid cell dependent generalized risk transfer or insurance risks are generated based upon vulnerability factors for on-ground risk-exposed units, triggering the activation of an automated risk transfer system.

18. The parametric risk transfer system according to claim 15, wherein by means of different correlation modules, wind-exposed cell zones along an even topological exposed rating scale are generated located in a comparable inherent topology of the landscape and measured wind risk exposure based on historical wind data and/or dynamic captured measuring data and/or dynamically generated wind fields.

19. The parametric risk transfer system according to claim 18, wherein the generation of the grid cells is performed based upon wind-exposed cell zones.

20. The parametric risk transfer system according to claim 19, wherein, additionally, the generation is improved by a Sea, Lake and Overland Surges from Hurricanes (SLOSH) method or any other appropriate prior art method for forecasting and estimating storm event exposure, storm risks and a behavior of storm events.

21. The parametric risk transfer system according to claim 1, wherein the parametric risk transfer system is based on an automated risk transfer unit with a resource pooling system for risk sharing of the storm risks of a variable number of risk-exposed units by providing a dynamic self-sufficient risk protection for the risk-exposed units by means of the automated resource pooling system, wherein the resource pooling system comprises an assembly module to process risk-related units' data and provide the likelihood of said risk exposure for one or a plurality of the pooled risk-exposed units based on risk-related component data, wherein the risk-exposed units are connected to the resource pooling system by means of a plurality of payment-receiving modules configured to receive and store payments from the risk-exposed units to pool their risks and resources, and wherein the event-driven trigger module is triggering the grid cell specific risk-exposure parameter and/or indexed wind field parameters of the wind field profile exceeding a predefined trigger index to provide risk protection for a specific risk-exposed unit based on received and stored payments from the risk-exposed unit, and wherein if the indexed wind field parameters of the wind field profile exceed the predefined trigger index value, a loss associated with the risk-exposed units of a triggered grid cell is distinctly covered by the resource pooling system by means of a parametric transfer of payments from the resource pooling system and the automated risk transfer unit to the risk-exposed unit.

22. The parametric risk transfer system according to claim 21, wherein the automated risk transfer unit with the resource pooling system comprises an assembly module to process risk-related component data of the risk-exposed units and to provide the likelihood of said risk exposure for one or a plurality of the pooled risk-exposed units, and wherein the receiving and preconditioned storage of payments from risk exposure components for the pooling of their risks is dynamically determinable based on total risk and/or the likelihood of the risk exposure of the pooled risk-exposed units.

23. The parametric risk transfer system according to claim 21, wherein the number of pooled risk-exposed units is dynamically adaptable by means the automated risk transfer unit with the resource pooling system to a range where non-covariant occurring risks covered by the resource pooling system affect only a relatively small proportion of the fully pooled risk-exposed units at a given time.

24. The parametric risk transfer system according to claim 21, wherein upon each triggering of an indexed wind field parameter of the wind field profile and/or associated risk exposure parameter exceeding the predefined trigger index based on the weather measuring parameters and/or the data records indicating one of the defined storm events, a total parametric payment is allocated with the triggering, wherein at least a first portion of a fully allocated payment is transferred upon triggering the excess of the trigger index or the trigger indices.

25. The parametric risk transfer system according to claim 21, wherein the parametric risk transfer system provides a dynamic, self-sufficient risk protection structure for a variable number of defined risk exposure components, wherein the risk exposure components are connected to the risk transfer unit of the weather events-triggered system by transferring risk exposure associated with the occurrence of the defined storm risk events from the risk exposure components to the risk transfer unit by means of equitable, mutually aligned first risk transfer parameters and correlated aligned first payment transfer parameters to the automated resource pooling system for pooling of electronic payment parameters, wherein the risk transfer unit is connected to a second risk transfer unit with a second automated resource pooling system by means of the signal generator of the storm event-triggered system by transferring risk exposure associated with the occurrence of the defined storm risk events from the risk transfer unit to the second risk transfer unit by means of equitable, mutually aligned second risk transfer parameters and correlated aligned second payment transfer parameters at least partially transferring resources from the resource pooling system to the second resource pooling system, and wherein, if one of the defined storm risk events occurs, loss parameters measuring the loss at the risk exposure components are captured and transmitted to the risk transfer unit, and wherein the occurred loss is automatically covered by the risk transfer unit and/or the second risk transfer unit activated by means of the output activation signal generated by means of the signal generator based on the equitable, mutually aligned second risk transfer parameters.

26. The parametric risk transfer system according to claim 1, wherein measuring stations comprise land-based weather flow stations, satellite-based or plane-based or ship-based measuring devices.

27. The parametric risk transfer system according to claim 1, wherein for each selectable grid cell based on the proximity of the measuring station, a station weighting factor is assigned to each measuring station having a higher value the closer a weather flow station is to the grid cell.

28. A method for a parametric risk transfer system based on automated location-dependent probabilistic tropical storm risk and storm impact forecast, wherein weather measuring parameters of weather events are measured, recorded by means of a plurality of delocalized distributed measuring stations and transmitted to a central system, and wherein the measured weather measuring parameters at least comprise measuring parameters of wind speed and/or maximum wind speed within a predefined time frame, wherein
 a spatial high-resolution grid comprising grid cells is generated over a geographical area of interest by means of a capturing unit, said area including at least a portion of risk-exposed units on the ground, wherein a plurality of delocalized distributed measuring stations are selected and associated with the grid, and wherein each cell of the grid has a defined distance from each of the delocalized distributed measuring stations,
 measuring parameters of the delocalized distributed measuring stations associated with the grid are transferred to the capturing unit by means of a data transmission network, wherein the capturing unit comprises a memory store with a searchable data table wherein data records comprising transmitted measuring parameters are stored assigned to the corresponding measuring station by means of the searchable data table,
 by means of a core engine, indexed wind field parameters are dynamically generated for different capturing time frames according to the spatial high-resolution grid and associated with a wind field profile, wherein for each grid cell of the wind field profile, the wind field parameters are determined based on the transmitted measuring parameters or data records, summing up the transmitted measuring parameters of all weather flow stations weighted by the station weighting factor assigned to the corresponding measuring station and grid cell, and normalized over all of the grid cells,
 grid cell specific risk-exposure parameters are generated by means of the system based upon the indexed wind field parameters of the wind field profile, and
 by triggering a grid cell specific risk-exposure parameter and/or an indexed wind field parameter of the wind field profile exceeding a predefined trigger index value by means of a trigger module, an output activation signal is generated by the signal generator based on the triggered excess of the grid cell specific risk-exposure parameter and/or indexed wind field value and transmitted to at least one associated activation device, wherein the operation of the activation device is steered by the transmitted output activation signal.

29. The method according to claim 28, wherein measuring stations comprise land-based weather flow stations, satellite-based or plane-based or ship-based measuring devices.

30. The method according to claim 28, wherein for each selectable grid cell based on the proximity of the measuring station, a station weighting factor is assigned to each measuring station having a higher value the closer a weather flow station is to the grid cell.

\* \* \* \* \*